(12) United States Patent
Walker et al.

(10) Patent No.: US 9,843,844 B2
(45) Date of Patent: Dec. 12, 2017

(54) NETWORK STREAMING OF MEDIA DATA

(71) Applicant: QUALCOMM Incorporated, San Diego, CA (US)

(72) Inventors: Gordon Kent Walker, Poway, CA (US); Michael G. Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 13/644,336

(22) Filed: Oct. 4, 2012

(65) Prior Publication Data

US 2013/0091251 A1 Apr. 11, 2013

Related U.S. Application Data

(60) Provisional application No. 61/703,174, filed on Sep. 19, 2012, provisional application No. 61/543,792, filed on Oct. 5, 2011.

(51) Int. Cl.
*H04N 21/845* (2011.01)
*H04N 21/61* (2011.01)
(Continued)

(52) U.S. Cl.
CPC ..... *H04N 21/6125* (2013.01); *H04N 21/2343* (2013.01); *H04N 21/23424* (2013.01);
(Continued)

(58) Field of Classification Search
CPC ........... H04N 21/2387; H04N 21/2347; H04N 21/4405; H04N 21/47202;
(Continued)

(56) References Cited

U.S. PATENT DOCUMENTS 3,909,721 A 9/1975 Bussgang et al.
4,365,338 A 12/1982 McRae et al.
(Continued)

FOREIGN PATENT DOCUMENTS

CN 1338839 A 3/2002
CN 1425228 A 6/2003
(Continued)

OTHER PUBLICATIONS

3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.
(Continued)

*Primary Examiner* — Barbara B Anyan
(74) *Attorney, Agent, or Firm* — Kilpatrick Townsend & Stockton, LLP

(57) ABSTRACT

In one example, a device includes one or more processors configured to receive a first segment of media data, wherein the media data of the first segment comprises a stream access point, receive a second segment of media data, wherein the media data of the second segment lacks a stream access point at the beginning of the second segment, and decode at least a portion of the media data of the second segment relative to at least a portion of data for the first segment. In this manner, the techniques of this disclosure may be used to achieve a Low Latency Live profile for, e.g., dynamic adaptive streaming over HTTP (DASH).

60 Claims, 20 Drawing Sheets

(51) Int. Cl.
*H04N 21/234* (2011.01)
*H04N 21/2343* (2011.01)
*H04N 5/44* (2011.01)
*H04L 12/801* (2013.01)
*H04N 19/597* (2014.01)

(52) U.S. Cl.
CPC ..... *H04N 21/8455* (2013.01); *H04N 21/8456* (2013.01); *H04L 47/10* (2013.01); *H04N 5/4401* (2013.01); *H04N 19/597* (2014.11)

(58) Field of Classification Search
CPC ............. H04N 21/47217; H04N 19/44; H04N 19/107; H04N 19/177; H04N 19/20; H04N 19/50; H04N 19/503; H04L 67/06; H04L 65/607
USPC ........ 709/203, 217, 219, 224, 231, 232, 236
See application file for complete search history.

(56) References Cited

U.S. PATENT DOCUMENTS

| | | |
|---|---|---|
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |

(56) References Cited

U.S. PATENT DOCUMENTS

| | | | |
|---|---|---|---|
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,113,773 B2 | 9/2006 | Quick, Jr. et al. |
| 7,139,660 B2 | 11/2006 | Sarkar et al. |
| 7,139,960 B2 | 11/2006 | Shokrollahi et al. |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi et al. |
| 7,418,651 B2 | 8/2008 | Luby et al. |
| 7,451,377 B2 | 11/2008 | Shokrollahi et al. |
| 7,483,447 B2 | 1/2009 | Chang et al. |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts et al. |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,331,445 B2 | 12/2012 | Garudadri et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,812,735 B2 | 8/2014 | Igarashi |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086494 A1* | 5/2003 | Wang ............... G10L 19/005 375/240.12 |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0240382 A1 | 12/2004 | Ido et al. |
| 2004/0255328 A1 | 12/2004 | Baldwin et al. |
| 2005/0018635 A1 | 1/2005 | Proctor, Jr. |
| 2005/0028067 A1 | 2/2005 | Weirauch |
| 2005/0071491 A1 | 3/2005 | Seo |
| 2005/0084006 A1 | 4/2005 | Lei et al. |
| 2005/0091697 A1 | 4/2005 | Tanaka et al. |
| 2005/0097213 A1 | 5/2005 | Barrett et al. |
| 2005/0105371 A1 | 5/2005 | Johnson et al. |
| 2005/0123058 A1 | 6/2005 | Greenbaum et al. |
| 2005/0138286 A1 | 6/2005 | Franklin et al. |
| 2005/0152448 A1* | 7/2005 | Crinon ............. H04N 21/23424 375/240.01 |
| 2005/0160272 A1 | 7/2005 | Teppler |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0207392 A1 | 9/2005 | Sivalingham et al. |
| 2005/0216472 A1 | 9/2005 | Leon et al. |
| 2005/0216951 A1* | 9/2005 | MacInnis ............ H04N 5/4401 725/135 |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0087456 A1 | 4/2006 | Luby |

(56) References Cited

U.S. PATENT DOCUMENTS

| | | |
|---|---|---|
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0110074 A1 | 5/2007 | Bradley et al. |
| 2007/0140369 A1 | 6/2007 | Limberg et al. |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0177811 A1 | 8/2007 | Yang |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1 | 8/2007 | Watson et al. |
| 2007/0230568 A1 | 10/2007 | Eleftheriadis et al. |
| 2007/0233784 A1 | 10/2007 | Orourke et al. |
| 2007/0255844 A1 | 11/2007 | Shen et al. |
| 2007/0277209 A1 | 11/2007 | Yousef |
| 2007/0291836 A1* | 12/2007 | Shi .................. H04N 21/234381 375/240.01 |
| 2008/0010153 A1 | 1/2008 | Pugh-O'Connor et al. |
| 2008/0034273 A1 | 2/2008 | Luby |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1 | 11/2008 | Park et al. |
| 2008/0303893 A1 | 12/2008 | Kim et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0195640 A1* | 8/2009 | Kim .................. H04N 13/004 348/43 |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1* | 12/2009 | Schnell .............. G06F 17/3002 |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0246659 A1* | 10/2011 | Bouazizi ............ H04N 21/2343 709/231 |
| 2011/0255535 A1* | 10/2011 | Tinsman .................. H04L 47/10 370/390 |
| 2011/0258510 A1 | 10/2011 | Watson et al. |
| 2011/0268178 A1 | 11/2011 | Park et al. |
| 2011/0271092 A1* | 11/2011 | Brelay .................. G11B 27/005 713/150 |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2011/0307581 A1 | 12/2011 | Furbeck et al. |
| 2012/0013746 A1 | 1/2012 | Chen et al. |
| 2012/0016965 A1 | 1/2012 | Chen et al. |
| 2012/0020413 A1* | 1/2012 | Chen .................. H04N 19/597 375/240.26 |
| 2012/0023249 A1 | 1/2012 | Chen et al. |
| 2012/0023254 A1* | 1/2012 | Park .................. H04L 65/4084 709/231 |
| 2012/0033730 A1* | 2/2012 | Lee .................. H04L 65/607 375/240.12 |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0099593 A1 | 4/2012 | Luby |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0207068 A1 | 8/2012 | Watson et al. |

(56) References Cited

U.S. PATENT DOCUMENTS

| | | |
|---|---|---|
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |
| 2014/0380113 A1 | 12/2014 | Luby |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1806392 A | 7/2006 |
| CN | 1819661 A | 8/2006 |
| CN | 1868157 A | 11/2006 |
| CN | 100359949 C | 1/2008 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1051027 A1 | 11/2000 |
| EP | 1124344 A1 | 8/2001 |
| EP | 1241795 A2 | 9/2002 |
| EP | 1298931 A2 | 4/2003 |
| EP | 1406452 A2 | 4/2004 |
| EP | 1455504 A2 | 9/2004 |
| EP | 1670256 A2 | 6/2006 |
| EP | 1755248 A1 | 2/2007 |
| EP | 2071827 A2 | 6/2009 |
| EP | 1700410 B1 | 4/2010 |
| EP | 1665539 | 4/2013 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 A | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 A | 12/2002 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2003333577 A | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004516717 A | 6/2004 |
| JP | 2004192140 A | 7/2004 |
| JP | 2004193992 A | 7/2004 |
| JP | 2004529533 A | 9/2004 |
| JP | 2004289621 A | 10/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 A | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |
| JP | 2007089137 A | 4/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2009027598 A | 2/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539832 A | 12/2010 |
| JP | 2011087103 A | 4/2011 |
| JP | 4971144 B2 | 7/2012 |
| JP | 5231218 | 3/2013 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | I246841 B | 1/2006 |
| TW | I354908 | 12/2011 |
| TW | I355168 | 12/2011 |
| WO | 9634463 A1 | 10/1996 |
| WO | WO-9750183 A1 | 12/1997 |
| WO | 9804973 A1 | 2/1998 |
| WO | WO-9832256 A1 | 7/1998 |
| WO | 0014921 A1 | 3/2000 |
| WO | 0052600 A1 | 9/2000 |
| WO | 0157667 A1 | 8/2001 |
| WO | 0158130 A2 | 8/2001 |
| WO | 0158131 A2 | 8/2001 |
| WO | 0227988 A2 | 4/2002 |
| WO | 02063461 A1 | 8/2002 |

(56) References Cited

FOREIGN PATENT DOCUMENTS

| WO | WO-03046742 A1 | 6/2003 |
|---|---|---|
| WO | WO-03105484 A1 | 12/2003 |
| WO | 2004015948 A1 | 2/2004 |
| WO | 2004019521 A1 | 3/2004 |
| WO | 2004030273 A1 | 4/2004 |
| WO | 2004036824 A1 | 4/2004 |
| WO | 2004040831 A1 | 5/2004 |
| WO | 2004047455 A1 | 6/2004 |
| WO | WO-2004047019 A2 | 6/2004 |
| WO | WO-2004088988 A1 | 10/2004 |
| WO | WO-2004109538 A1 | 12/2004 |
| WO | 2005041421 A1 | 5/2005 |
| WO | 2005078982 A1 | 8/2005 |
| WO | WO-2005107123 | 11/2005 |
| WO | WO-2006013459 A1 | 2/2006 |
| WO | WO-06036276 | 4/2006 |
| WO | 2006060036 A1 | 6/2006 |
| WO | WO-2006057938 A2 | 6/2006 |
| WO | 2006084503 A1 | 8/2006 |
| WO | WO-2006116102 A2 | 11/2006 |
| WO | WO-2006135878 A2 | 12/2006 |
| WO | 2007078253 A2 | 7/2007 |
| WO | 2007090834 A2 | 8/2007 |
| WO | WO-2007098397 A2 | 8/2007 |
| WO | WO-2007098480 A1 | 8/2007 |
| WO | 2008011549 A2 | 1/2008 |
| WO | WO-2008023328 A3 | 4/2008 |
| WO | 2008054100 A1 | 5/2008 |
| WO | 2008085013 A1 | 7/2008 |
| WO | 2008086313 A1 | 7/2008 |
| WO | WO-2008131023 A1 | 10/2008 |
| WO | 2008144004 A1 | 11/2008 |
| WO | WO-2009065526 A1 | 5/2009 |
| WO | WO-2009137705 A2 | 11/2009 |
| WO | 2009143741 A1 | 12/2009 |
| WO | 2010085361 A2 | 7/2010 |
| WO | WO-2011038013 | 3/2011 |
| WO | WO-2011038034 A1 | 3/2011 |
| WO | 2011039617 A1 | 4/2011 |
| WO | 2011059286 A2 | 5/2011 |
| WO | 2011070552 A1 | 6/2011 |
| WO | 2011102792 A1 | 8/2011 |
| WO | WO-2012021540 | 2/2012 |
| WO | WO-2012109614 A1 | 8/2012 |

OTHER PUBLICATIONS

3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010,p. 85-102,URL,http://www.3gpp.org/ftp/TSG_SA/WG4_CODEC/TSGS4_59/Docs/S4-100511.zip,26234-930.zip.
Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Luby M., "LT Codes", Foundations of Computer Science, 2002, Proceedings, The 43rd Annual IEEE Symposium on, 2002.
Morioka S., "A Verification Methodology for Error Correction Circuits over Galois Fields", Tokyo Research Laboratory, IBM Japan Ltd, pp. 275-280, Apr. 22-23, 2002.
QUALCOMM Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.
QUALCOMM Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.

Luby M., "Simple Forward Error Correction (FEC) Schemes," draft-luby-rmt-bb-fec-supp-simple-00.txt, pp. 1-14, Jun. 2004.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005 (Jun. 1, 2005), XP002695256, Retrieved from the Internet: URL:http://www.etsi.org/deliver/etsi_ts/126300_126399/126346/06.01.00_60/ts_126346v060100p.pdf.
3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.
3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.
3rd Generation Partnership Project, Technical Specification Group Services and System Aspects Transparent end-to-end packet switched streaming service (PSS), 3GPP file format (3GP) (Release 9) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009 (Jun. 1, 2009), pp. 1-52, XP050370199.
3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010 (Jun. 9, 2010), pp. 1-55, XP050441544, [retrieved on Jun. 9, 2010].
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3RD Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011 (Jun. 17, 2011), pp. 1-94, XP050553206, [retrieved on Jun. 17, 2011].
Aggarwal, C. et al.: "A Permutation-Based Pyramid Broadcasting Scheme for Video-on-Demand Systems," Proc. IEEE Int'l Conf. on Multimedia Systems, Hiroshima, Japan (Jun. 1996).
Aggarwal, C. et al.: "On Optimal Batching Policies for Video-on-Demand Storage Servers," Multimedia Systems, vol. 4, No. 4, pp. 253-258 (1996).
Albanese, A., et al., "Priority Encoding Transmission", IEEE Transactions on Information Theory, vol. 42, No. 6, pp. 1-22, (Nov. 1996).
Alex Zambelli,"IIS Smooth Streaming Technical Overview", Microsoft Mar. 25, 2009 (Mar. 25, 2009), XP002620446, Retrieved from the Internet: URL:http://www.microsoft.com/downloads/en/details.aspx"FamilyID=03d22583-3ed6-44da-8464-blb4b5ca7520, [retrieved on Jan. 21, 2011].
Almeroth, et al., "The use of multicast delivery to provide a scalable and interactive video-on-demand service", IEEE Journal on Selected Areas in Communication, 14(6): 1110-1122, (1996).
Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.
Amin Shokrollahi: "LDPC Codes: An Introduction" Internet Citation 2 Apr. 1, 2003 (Apr. 2, 2003), XP002360065 Retrieved from the Internet: URL : http ://www . ipm. ac . ir/IPM/homepage/Amin 2.pdf [retrieved on Dec. 19, 2005].
Amon Petal., "File Format for Scalable Video Coding", IEEE Transactions on Circuits and Systems for Video Technology, IEEE

(56) References Cited

OTHER PUBLICATIONS

Service Center, Piscataway, NJ, US, vol. 17, No. 9, Sep. 1, 2007 (Sep. 1, 2007), pp. 1174-1185, XP011193013, ISSN: 1051-8215, DOI:10.1109/TCSVT.2007.905521.
Anonymous: [Gruneberg, K., Narasimhan, S. and Chen, Y., editors] "Text of ISO/IEC 13818-1:2007/PDAM 6 MVC operation point descriptor", 90 MPEG Meeting; Oct. 26, 2009-Oct. 30, 2009; Xian; (Motion Picture Expertgroup or ISO/IEC JTC1/SC29/WG111), No. N10942, Nov. 19, 2009 (Nov. 19, 2009), XP030017441.
Anonymous: "Technologies under Consideration", 100. MPEG Meeting;Apr. 30, 2012-Apr. 5, 2012; Geneva; (Motion Picture Expert Group or ISO/IEC JTC1 /SC29/WG11),, No. N12682, Jun. 7, 2012 (Jun. 7, 2012), XP030019156.
Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008 (Apr. 22, 2008), XP030016172.
Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11),, No. N11139, Jan. 22, 2010 (Jan. 22, 2010), XP030017636, ISSN: 0000-0030 the whole document.
ATIS: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].
Bar-Noy, et al., "Competitive on-line stream merging algorithms for media-on-demand", Draft (Jul. 2000), pp. 1-34.
Bar-Noy et al. "Efficient algorithms for optimal stream merging for media-on-demand," Draft (Aug. 2000), pp. 1-43.
Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 889-893, XP000464977.
Bitner, J.R., et al.: "Efficient Generation of the Binary Reflected Gray code and Its Applications," Communications of the ACM, pp. 517-521, vol. 19 (9), 1976.
Blomer, et al., "An XOR-Based Erasure-Resilient Coding Scheme," ICSI Technical Report No. TR-95-048 (1995) [avail. At ftp://ftp.icsi.berkeley.edu/pub/techreports/1995/tr-95-048.pdf].
Bouazizi I., et al., "Proposals for ALC/FLUTE server file format (14496-12Amd.2)", 77. MPEG Meeting; Jul. 17, 2006-Jul. 21, 2006; Klagenfurt; (Motion PictureExpert Group or ISO/IEC JTC1/SC29/WG11), No. M13675, Jul. 12, 2006 (Jul. 12, 2006), XP030042344, ISSN: 0000-0236.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.
Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.
Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.
Charles Lee L.H, "Error-Control Block Codes for Communications Engineers", 2000, Artech House, XP002642221 pp. 39-45.
Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.
Choi S: "Temporally enhanced erasure codes for reliable communication protocols" Computer Networks, Elsevier Science Publishers B.V., Amsterdam, NL, vol. 38, No. 6, Apr. 22, 2002 (Apr. 22, 2002), pp. 713-730, XP004345778, ISSN: 1389-1286, DOI:10.1016/S1389-1286(01)00280-8.
Clark G.C., et al., "Error Correction Coding for Digital Communications, System Applications," Error Correction Coding for Digital Communications, New York, Plenum Press, US, Jan. 1, 1981, pp. 331-341.
D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009 (Dec. 31, 2009), pp. 1-10, XP002582035 Retrieved from the Internet: URL:http://www.hindawi.com/journals/ijdmb/ 2009/614178.html> [retrieved on May 12, 2010].
Dan, A. et al.: "Scheduling Policies for an On-Demand Video Server with Batching," Proc. ACM Multimedia, pp. 15-23 (Oct. 1998).
Davey, M.C. et al.: "Low Density Parity Check Codes over GF(q)" IEEE Communications Letters, vol. 2, No. 6 pp. 165-167 (1998).
Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/TSGS4_34/Docs.
Digital Fountain: "Raptor code specification for MBMS file download," 3GPP SA4 PSM AD-HOC #31 (May 21, 2004) XP002355055 pp. 1-6.
"Digital Video Broadcasting (DVB); Guidelines for the implementation of DVB-IP Phase 1 specifications; ETSI TS 102 542" ETSI Standards, Lis, Sophia AntipolisCedex, France, vol. BC, No. V1.2.1, Apr. 1, 2008 (Apr. 1, 2008), XP014041619 ISSN: 0000-0001 p. 43 p. 66 pp. 70, 71.
DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.
Eager, et al. "Minimizing bandwidth requirements for on-demand data delivery," Proceedings of the International Workshop on Advances in Multimedia Information Systems,p. 80-87 (Indian Wells, CA Oct. 1999).
Eager, et al., "Optimal and efficient merging schedules for video-on-demand servers", Proc. ACM Multimedia, vol. 7, pp. 199-202 (1999).
Esaki, et al.: "Reliable IP Multicast Communication Over ATM Networks Using Forward Error Correction Policy," IEICE Transactions on Communications, JP, Institute of Electronics Information and Comm. ENG. Tokyo, vol. E78-V, No. 12, (Dec. 1995), pp. 1622-1637, XP000556183.
Feng, G., Error Correcting Codes over Z2m for Algorithm-Based Fault-Tolerance, IEEE Transactions on Computers, vol. 43, No. 3, Mar. 1994, pp. 370-374.
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010 (Jul. 22, 2010), XP030046346.

(56) References Cited

OTHER PUBLICATIONS

Fielding et al., "RFC 2616: Hypertext Transfer Protocol HTTP/1.1", Internet Citation, Jun. 1999 (Jun. 1999), pp. 165, XP002196143, Retrieved from the Internet: URL:http://www.rfc-editor-org/ [retrieved on Apr. 15, 2002].
Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion Picturexpert Group or ISO/ IEC JTC1/SC29/WG11),, No. M13855, Oct. 13, 2006 (Oct. 13, 2006), XP030042523, ISSN: 0000-0233.
Gao, L. et al.: "Efficient Schemes for Broadcasting Popular Videos," Proc. Inter. Workshop on Network and Operating System Support for Digital Audio and Video, pp. 1-13 (1998).
Gasiba, Tiago et al., "System Design and Advanced Receiver Techniques for MBMS Broadcast Services" Proc. 2006 International Conference on Communications (ICC 2006), Jun. 1, 2006 (Jun. 1, 2006), pp. 5444-5450, XP031025781 ISBN: 978-1-4244-0354-7.
Gemmell, et al., "A Scalable Multicast Architecture for One-To-Many Telepresentations", Multimedia Computing and Systems, 1998/ Proceedings. IEEE International Conference on Austin, TX, USA Jun. 28-Jul. 1, 1998, Los Alamitos, CA USA, IEEE Comput. Soc, US, Jun. 28, 1998, pp. 128-139, XP010291559.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].
Gozalvez D et, al: "Mobile reception of DVB-T services by means of AL-FEC protection" Proc. IEEE Intern. Symposium on Broadband Multimedia Systems and Broadcasting (BMSB '09), IEEE, Piscataway, NJ, USA, May 13, 2009 (May 13, 2009), pp. 1-5, XP031480155 ISBN: 978-1-4244-2590-7.
Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.
Hagenauer, J. : "Soft is better than hard" Communications, Coding and Cryptology, Kluwer Publication May 1994 (May 1994), XP002606615 Retrieved from the Internet : URL: http://www.Int .ei .turn. de/veroeffentlic hungen/l994/ccc94h. pdf [retrieved on Oct. 25, 2010].
Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011 (Jul. 21, 2011), XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011 (Jul. 22, 2011), XP030049998.
Hershey, et al., "Random Parity Coding (RPC)", 1996 IEEE International Conference on Communications (ICC). Converging Technologies for Tomorrow's Applications. Dallas, Jun. 23-27, 1996, IEEE International Conference on Communications (ICC), New York, IEEE, US, vol. 1, Jun. 23, 1996, pp. 122-126, XP000625654.
Hua, et al., "Skyscraper broadcasting: A new broadcsting system for metropolitan video-on-demand systems", Proc. ACM SIGCOMM, pp. 89-100 (Cannes, France, 1997).
Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex ; France, vol. RAN WG1, No. Warsaw, Poland, Jun. 24, 2008, XP050110650, [retrieved on Jun. 24, 2008].
IETF RFC 2733: Rosenberg, J. et al. "An RTP Payload Format for Generic Forward Error Correction," Network Working Group, RFC 2733 (Dec. 1999).

International Search Report and Written Opinion—PCT/US2012/053394—ISA/EPO—Feb. 6, 2013.
International Search Report and Written Opinion—PCT/US2012/058922—ISA/EPO—Dec. 7, 2012.
International Standard ISO/IEC 14496-12, Information Technology—Coding of audio-visual objects—Part 12: ISO base media file format, Third Edition, Oct. 15, 2008, 120 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol . 3, Mar. 18, 2005 (Mar. 18, 2005), pp. 1097-1100, XP010792442, DOI: 10.1109/ICASSP.2005.1415905 ISBN: 978-0-7803-8874-1.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, vol. 43, No. 6, Jun. 1, 1995, pp. 2005-2009.
Kimura et al., "A Highly Mobile SDM-0FDM System Using Reduced-Complexity-and-Latency Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007.4394758.
Kozamernik F: "Media streaming over the Internet", Internet Citation, Oct. 2002 (Oct. 2002), XP002266291, Retrieved from the Internet: URL: http://www.ebu.ch/trev_292-kozamerni k. pdf [retrieved on Jan. 8, 2004] section "Video codecs for scalable streaming".
Lee L., et al.,"VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.
Li, M., et al., "Playout Buffer and Rate Optimization for Streaming over IEEE 802.11 Wireless Networks", Aug. 2009, Worcester Polytechnic Institute, USA.
Lin, S. et al.: "Error Control Coding-Fundamentals and Applications," 1983, Englewood Cliffs, pp. 288, XP002305226.
Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007 (Oct. 1, 2007), XP015055125, ISSN: 0000-0003.
Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, et al., "FLUTE—File Delivery over Unidirectional Transport", IETF RFC 3926, Oct. 2004, pp. 1-35.
Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, pp. 1-9, New York, NY, USA, IEEE, US Aug. 16, 199.
Luby et, al. "Layered Coding Transport (LCT) Building Block", IETF RFC 5651, pp. 1-42, (Oct. 2009).

(56) References Cited

OTHER PUBLICATIONS

Luby et al., RaptorQ Forward Error Correction Scheme for Object Delivery draft-ietf-rmt-bb-fec-raptorq-00, Qualcomm, Inc. Jan. 28, 2010.
Luby, M. et al.: "Efficient Erasure Correction Codes," 2001, IEEE Transactions on Information Theory, Vo. 47, No. 2, pp. 569-584, XP002305225.
Luby, M., et, al. "Forward Error Correction (FEC) Building Block", IETF RFC 5052, pp. 1-31, (Aug. 2007).
Luby M et al: "IPTV Systems, Standards and Architectures: Part II—Application Layer FEC in IPTV Services" IEEE Communications Magazine, IEEE Service Center, Piscataway, US LNKDDOI: 10.1109/MCOM.2008.4511656, vol. 46, No. 5, May 1, 2008 (May 1, 2008), pp. 94-101, XP011226858 ISSN: 0163-6804.
Luby, M. et al.: "Pairwise Independence and Derandomization," Foundations and Trends in Theoretical Computer Science, vol. 1, Issue 4, 2005, Print ISSN 1551-305X, Online ISSN 1551-3068.
Luby, M. et al., "Practical Loss-Resilient Codes: Tornado Codes," 29th Annual ACM Symposium on Theory of Computing, vol. SYMP. 29, May 4, 1997, pp. 150-159, XP002271229.
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby, Michael G. "Analysis of Random Processes via And-Or Tree Evaluation," Proceedings of the 9th Annual ACM-SIAM Symposium on Discrete Algorithms,TR-97-0, 1998, pp. 364-373, (search date: Jan. 25, 2010) URL: <http://portal. acm.prg.citation.cfm"id=314722>.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].
MacKay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-COM:20050237.
Mandelbaum D.M., "An Adaptive-Feedback Coding Scheme Using Incremental Redundancy", IEEE Trans on Information Theory, vol. May 1974, May 1974 (May 1974), pp. 388-389, XP002628271, the whole document.
Matsuoka H., et al., "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan, ITC-SS21, 2010 IEICE, pp. 59-63.
Michael G et al., "Improved low-density parity-check codes using irregular graphs", Information Theory, IEEE Transactions on,Feb. 2001,vol. 47, No. 2,pp. 585-598.
Mimnaugh, A et, al. "Enabling Mobile Coverage for DVB-T" Digital Fountain Whitepaper Jan. 29, 2008 (Jan. 29, 2008), pp. 1-9, XP002581808 Retrieved from the Internet: URL:http://www.digitalfountain.com/ufiles/ library/DVB-T-whitepaper.pdf> [retrieved on May 10, 2010].
Min-Goo Kim: "On systematic punctured convolutional codes", IEEE Trans on Communications, vol. 45, No. 2, Feb. 1997 (Feb. 1997), XP002628272, the whole document, pp. 133-139.
Motorola et al: "An Analysis of DCD Channel Mapping to BCAST File Delivery Sessions; OMA-CD-DCD-2007-0112-INP_DCD_ Channel_Mapping_to_BCAST_File_Delivery", OMA-CD-DCD-2007-0112-INP_DCD_Channel_Mappi Ng_to_BCAST_ File_Delivery, Open Mobile Alliance (OMA), 4330 La Jolla Village Dr., Suite 110 San Diego, CA 92122; USA Oct. 2, 2007 (Oct. 2, 2007), pp. 1-13, XP064036903.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
NOKIA: "Reed-Solomon Code Specification for. MBMS Download and Streaming Services", 3GPP Draft; S4-050265_RS_SPEC, 3rd Generation Partnership Project (3GPP), Mobile Competence Centre ; 650, Route Des Lucioles ; F-06921 Sophia-Antipolis Cedex ; France, vol. SA WG4, No. San Diego, USA; Apr. 15, 2005, Apr. 15, 2005 (Apr. 15, 2005), XP050287675, [retrieved on Apr. 15, 2005].
NOKIA Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Pantos R et al., "HTTP Live Streaming; draft-pantos-http-live-streaming-OT.txt", HTTP Live Streaming; Draft-PANT0S-HTTP-Live-Streaming-01.TXT, Internet Engineering Task Force, IETF; StandardWorkingDraft, Internet Society (ISOC) 4, Rue Des Falaises CH-1205 Geneva, Switzerland, No. 1, Jun. 8, 2009 (Jun. 8, 2009), XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997 (Sep. 1, 1997), pp. 995-1012, XP00069594.
Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: "A Correction and an Addendum for" Variable-Rate Coding for Meteor-Burst Communications, IEEE Transactions on Communications, vol. 43, No. 12 pp. 2866-2867 (Dec. 1995).
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010 (Jul. 22, 2010), XP030046492.

(56) References Cited

OTHER PUBLICATIONS

Qualcomm Europe S A R L: "Baseline Architecture and Definitions for HTTP Streaming", 3GPP Draft; S4-090603_HTTP_Streaming_Architecture, 3rd Generation Partnership Project (3GPP), Mobile Competence Centre; 650, Route Des Lucioles; F-06921 Sophia-Antipolis Cedex; France, No. Kista; Aug. 12, 2009, Aug. 12, 2009 (Aug. 12, 2009), XP050356889.
Qualcomm Incorporated: "Use Cases and Examples for Adaptive httpstreaming", 3GPP Draft; S4-100408-Usecases-HSD, 3rd Generation Partnership Project (JGPP), Mobile Competence Centre; 650, Route Des Lucioles; F-06921 Sophia-Antipolis Cedex; France, vol. SA WG4, No. Prague, Czech Republic; Jun. 21, 2010, Jun. 17, 2010 (Jun. 17, 2010), XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc et al., "Format for HTTP Streaming Media Presentation Description", 3GPP Draft; S4-100020, 3rd Generation Partnership Project (3GPP), Mobile Competence Centre; 650, Route Des Lucioles; F-06921 Sophia-Anti Polis Cedex; France, vol. SA WG4, No. St Julians, Malta; Jan. 25, 2010, Jan. 20, 2010 (Jan. 20, 2010), XP050437753, [retrieved on Jan. 20, 2010].
Research in Motion UK Limited: "An MPD delta file for httpstreaming", 3GPP Draft; S4-100453, 3rd Generation Partnership Project (SGPP), Mobile Competence Centre; 650, Route Des Lucioles; F-06921 Sophia-Antipolis Cedex; France, vol. SA WG4, No. Prague, Czech Republic; Jun. 21, 2010, Jun. 16, 2010 (Jun. 16, 2010), XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010 (Jul. 26, 2010), XP030046369.
Rizzo L. "Effective Erasure Codes for Reliable Computer Communication Protocols," Computer Communication Review, 27 (2) pp. 24-36 (Apr. 1, 1997), XP000696916.
Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V., et, al. "Low Density Parity Check (LDPC) Staircase and Triangle Forward Error Correction (FEC) Schemes", IETF RFC 5170 (Jun. 2008), pp. 1-34.
Rost, S. et al., "The Cyclone Server Architecture: streamlining delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Roumy A., et al., "Unequal Erasure Protection and Object Bundle Protection with the Generalized Object Encoding Approach", Inria-00612583, Version 1, Jul. 29, 2011, 25 pages.
Schulzrinne, et al., "Real Time Streaming Protocol (RTSP)" Network Working Group, Request for Comments: 2326, Apr. 1998, pp. 1-92.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T Rec. H.222.0(May 2006)FPDAM 4, vol. MPEG2009, No. 10572, May 11, 2009 (May 11, 2009), pp. 1-20, XP002605067 p. 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm"id=1148681>.
Shokrollahi et al., "Design of Efficient Easure Codes with Differential Evolution", IEEE International Symposium on Information Theory, Jun. 25, 2000 (Jun. 25, 2000), pp. 5-5.
Sincoskie, W. D., "System Architecture for Large Scale Video on Demand Service," Computer Network and ISDN Systems, pp. 155-162, (1991).
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011 (Jul. 24, 2011), XP030048903.
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; S4-100080-MPD, 3rd Generation Partnership Project (3GPP), Mobile Competence Centre; 650, Route Des Lucioles; F-06921 Sophia-Antipolis Cedex; France, vol. SA WG4, No. St Julians, Malta; Jan. 25, 2010, Jan. 20, 2010 (Jan. 20, 2010), XP050437773, [retrieved on Jan. 20, 2010].
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, NS2003-331, IN2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010 (Jun. 1, 2010), XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs [12.6.3], [12.6.3.1], [12.6.4], [12.6.6].
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Subramaniyam R., "Publishing in Wireless and Wireline Environments," Ph. D Thesis, Rutgers, The State University of New Jersey (Nov. 1994), 180pages.
Wadayama T, "Introduction to Low Density Parity Check Codes and Sum-Product Algorithm," Technical Report of the Institute of

(56) References Cited

OTHER PUBLICATIONS

Electronics, Information and Communication Engineers, Dec. 6, 2001, vol. 101, No. 498, pp. 39-46, MR2001-83.
Watson, M., et, al. "Asynchronous Layered Coding (ALC) Protocol Instantiation", IETF RFC 5775, pp. 1-23, (Apr. 2010).
Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011,pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wong, J.W., "Broadcast delivery", Proceedings of the IEEE, 76(12): 1566-1577, (1988).
Yamanouchi N., et al., "Internet Multimedia Transmission with Packet Recovery by Using Forward Error Correction," Proceedings of DPS Workshop, The Information Processing Society of Japan, Dec. 6, 2000, vol. 2000, No. 15, pp. 145-150.
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002 (Nov. 21, 2002), pp. 1551-1553.
Zorzi, et al.: "On the Statistics of Block Errors in Bursty Channels," IEEE Transactions on Communications, vol. 45, No. 6, Jun. 1997, pp. 660-667.
Anonymous: "Technologies under Consideration", 98. MPEG Meeting; Nov. 28, 2011-Dec. 2, 2011; Geneva; (Motion Picture Expert Group or ISO/IEC JTC1/SC29/WG11),, No. N12330, Dec. 3, 2011 (Dec. 3, 2011), XP030018825.
Anonymous: "Text of ISO/IEC IS 23009-1 Media Presentation Description and Segment Formats", 98. MPEG Meeting; Nov. 28, 2011-Feb. 12, 2012; Geneva; (Motion Picture Expert Group or ISO/IEC JTC1/SC29/WG11) No. N12329, Jan. 6, 2012 (Jan. 6, 2012), XP030018824.
"Digital Video Broadcasting (DVB); Framing structure, channel coding and modulation for digital terrestrial television; ETSI EN 300 744" ETSI Standards, Lis, Sophia Antipolis Cedex, France, V1.6.1, pp. 9, Jan. 10, 2009 (Jan. 2009).
Kim J., et al., "Enhanced Adaptive Modulation and Coding Schemes Based on Multiple Channel Reportings for Wireless Multicast Systems", 62nd IEEE Vehicular Technology Conference, VTC-2005—Fall, Sep. 25-28, 2005, vol. 2, pp. 725-729, XP010878578, DOI: 1 0.1109/VETECF.2005.1558019, ISBN: 978-0-7803-9152-9.
Gerard F., et al., "HTTP Streaming MPEG media—Response to CFP", 93. MPEG Meeting, Geneva Jul. 26, 2010 to Jul. 30, 2010.
Chikara S., et al., "Add-on Download Scheme for Multicast Content Distribution Using LT Codes", IEICE. B, Communications, Aug. 1, 2006, J89-B (8), pp. 1379-1389.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995 (Jul. 1, 1995), pp. 938-942, XP000525729, ISSN: 0018-9340, DOI: 10.1109/12.392853.
Tetsuo M., et al., "Comparison of Loss Resilient Ability between Multi-Stage and Reed-Solomon Coding", Technical report of IEICE. CQ, Communication Quality, vol. 103 (178), Jul. 4, 2003, pp. 19-24.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Miller G., et al., "Bounds on the maximum likelihood decoding error probability of low density parity check codes", Information Theory, 2000. Proceedings. IEEE International Symposium on, 2000, p. 290.
Moriyama, S., "5. Present Situation of Terrestrial Digital Broadcasting in Europe and USA", Journal of The Institute of Image Information and Television Engineers, Nov. 20, 1999, vol. 53, No. 11, pp. 1476-1478.
Muramatsu J., et al., "Low density parity check matrices for coding of multiple access networks", Information Theory Workshop 2003. Proceedings. 2003 IEEE , Apr. 4, 2003, pp. 304-307.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Samukawa, H. "Blocked Algorithm for LU Decomposition" Journal of the Information Processing Society of Japan, Mar. 15, 1993, vol. 34, No. 3, pp. 398-408.
QUALCOMM Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.
Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.
Watson M., et al., "Raptor FEC Schemes for FECFRAME draft-ietf-fecframe-raptor-04," 2010, pp. 1-21, URL,http://tools.ietf.org/pdf/draft-ietf-fecframe-raptor-04.pdf.
Ramsey B, "HTTP Status: 206 Partial Content and Range Requests," May 5, 2008 obtained at http://benramsey.com/blog/2008/05/206-partial-content-and-range-requests/.
QUALCOMM Incorporated: "RaptorQ Technical Overview", pp. 1-12, Oct. 1, 2010.

\* cited by examiner

NETWORK STREAMING OF MEDIA DATA

This application claims the benefit of U.S. Provisional Application Ser. Nos. 61/543,792, filed Oct. 5, 2011, and 61/703,174, filed Sep. 19, 2012, the entire contents of each of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), the upcoming High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

SUMMARY

In general, this disclosure describes techniques for streaming media data over a network. More specifically, aspects of this disclosure relate to reducing latency associated with streaming media data over a network, e.g., in accordance with Dynamic Adaptive Streaming over HTTP (DASH). In some examples, the techniques of this disclosure include forming segments of media data that lack stream access points (SAPs) at the beginnings of the segments. For example, one or more segments may lack SAPs throughout the segments, or may include SAPs at positions other than the beginnings of the SAPs. As an example, a SAP at a position other than the beginning of a segment may be used in place of a forced SAP, that is, a SAP that is mandated by an applicable standard.

In one example, a method includes receiving a first segment of media data, wherein the media data of the first segment comprises a first stream access point, receiving a second segment of media data, wherein the media data of the second segment lacks a stream access point at the beginning of the second segment, and before a second stream access point, subsequent to the first stream access point, is available, decoding at least a portion of the media data of the second segment relative to at least a portion of the media data of the first segment.

In another example, a device includes one or more processors configured to receive a first segment of media data, wherein the media data of the first segment comprises a first stream access point, receive a second segment of media data, wherein the media data of the second segment lacks a stream access point at the beginning of the second segment, and before a second stream access point, subsequent to the first stream access point, is available, decode at least a portion of the media data of the second segment relative to at least a portion of the media data of the first segment.

In another example, a device includes means for receiving a first segment of media data, wherein the media data of the first segment comprises a first stream access point, means for receiving a second segment of media data, wherein the media data of the second segment lacks a stream access point at the beginning of the second segment, and means for decoding, before a second stream access point, subsequent to the first stream access point, is available, at least a portion of the media data of the second segment relative to at least a portion of the media data of the first segment.

In another example, a computer-readable storage medium has stored thereon instructions that, when executed, cause a processor to receive a first segment of media data, wherein the media data of the first segment comprises a first stream access point, receive a second segment of media data, wherein the media data of the second segment lacks a stream access point at the beginning of the second segment, and before a second stream access point, subsequent to the first stream access point, is available, decode at least a portion of the media data of the second segment relative to at least a portion of the media data of the first segment.

In another example, a method includes obtaining a first segment of media data, wherein the media data of the first segment comprises a first stream access point, sending the first segment to a client device, obtaining a second segment of media data, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, sending the second segment to the client device.

In another example, a device includes one or more processors configured to obtain a first segment of media data, wherein the media data of the first segment comprises a first stream access point, send the first segment to a client device, obtain a second segment of media data, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, send the second segment to the client device.

In another example, a device includes means for obtaining a first segment of media data, wherein the media data of the first segment comprises a first stream access point, means for sending the first segment to a client device, means for obtaining a second segment of media data, wherein the media data of the second segment lacks a stream access point at the beginning of the second segment and wherein at least a portion of the media data of the second segment is coded relative to a portion of the media data of the first segment, and means for sending, before a second stream access point, subsequent to the first stream access point, is available, the second segment to the client device.

In another example, a computer-readable storage medium has stored thereon instructions that, when executed, cause a processor to obtain a first segment of media data, wherein the media data of the first segment comprises a first stream access point, send the first segment to a client device, obtain a second segment, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, send the second segment to the client device.

The details of one or more examples are set forth in the accompanying drawings and the description below. Other features, objects, and advantages will be apparent from the description and drawings, and from the claims.

DETAILED DESCRIPTION

Figure 1:
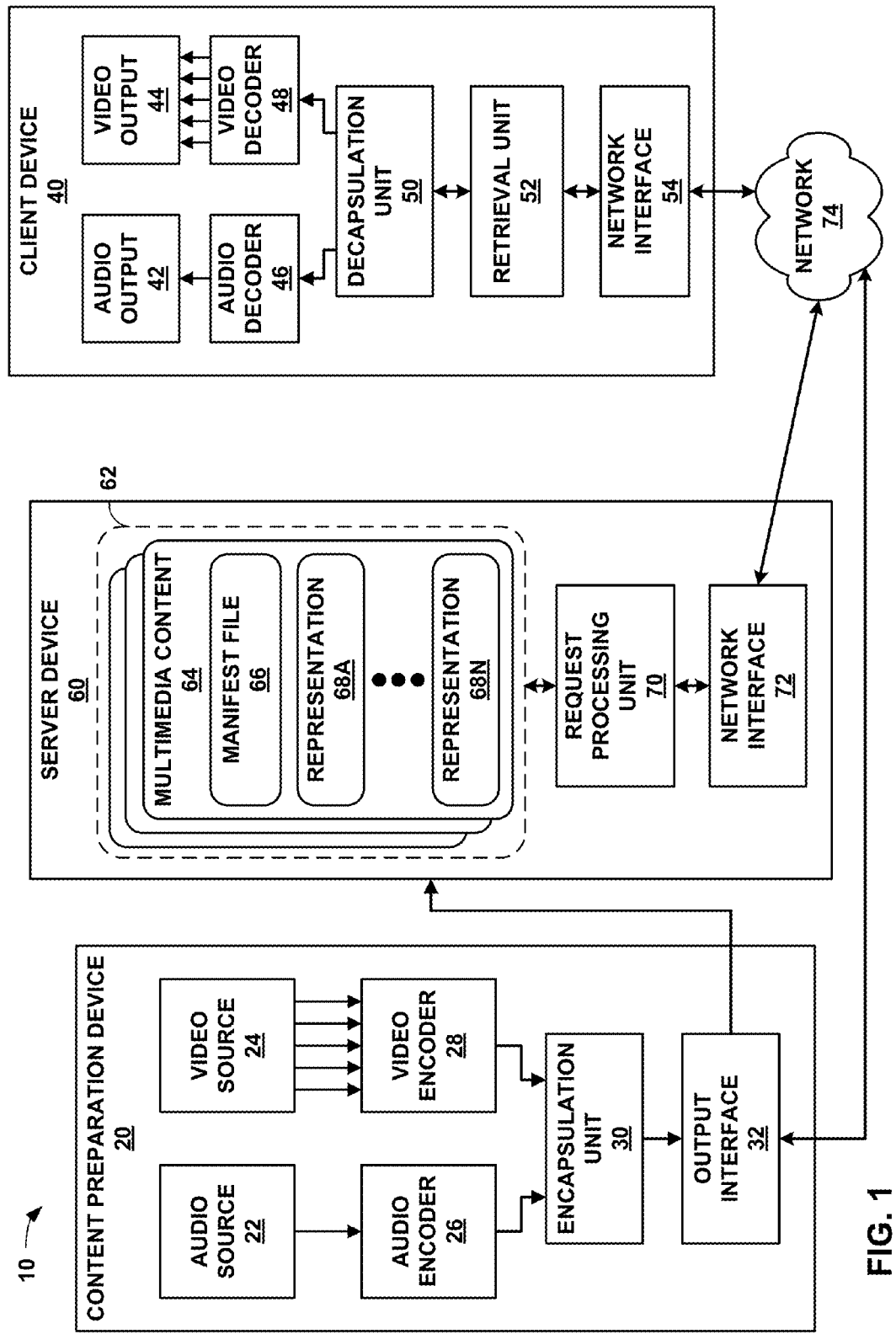
FIG. 1 is a block diagram illustrating an example system that implements techniques for streaming media data over a network.

In general, this disclosure describes techniques for streaming multimedia data, such as audio and video data, over a network. The techniques of this disclosure may be used in conjunction with Dynamic Adaptive Streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other audio/video content, which may also include text overlays or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form an adaptation set, in that representations in the set can be used for bandwidth adaptation. In some instances, an adaptation set may also be referred to as a "representation group." Representations in the set may differ in bitrate, resolution, and/or frame rate, but otherwise share substantially the same characteristics. In this manner, a client device may determine various sets of common characteristics for adaptation sets of multimedia content, and select an adaptation set based on coding and rendering capabilities of the client device. Then, the client device may adaptively switch between representations in the selected adaptation set based on bandwidth availability.

The content preparation device may also provide separate network locations for different portions of a manifest file, such as a media presentation description (MPD) file in a format prescribed by 3GPP (Third Generation Partnership Project). That is, different portions of the manifest file may be independently addressable by, e.g., various uniform resource identifiers (URIs), such as uniform resource locators (URLs). An initial portion of the manifest file may include a URI, URL, or other location identifier of another portion of the manifest file. For example, a first portion of the manifest file may include descriptions of common characteristics of adaptation sets, as discussed above.

Each of the adaptation sets may be associated with a respective different portion of the manifest file, which may include data indicative of locations of media data of representations in the respective adaptation set. In this manner, a client device may receive the first portion of the manifest file, select an appropriate adaptation set, retrieve another portion of the manifest file for the selected adaptation set, select a representation of the selected group, and use the other portion of the manifest file to retrieve data of the selected representation. Moreover, the client device may adapt to changing network bandwidth using the other portion of the manifest file, that is, the portion specific to the selected adaptation set.

DASH may also be used in the context of streaming of live content, that is, media content that is recorded live, e.g., during a sporting event, a newsworthy event, or other event that viewers wish to see substantially in real time. For example, Enhanced Multimedia Broadcast Multicast Service (eMBMS) may be used to stream DASH segments that are formed substantially in real time. Because of viewers' desire to see the content in as close to real time as possible, techniques that reduce latency (that is, delay between the occurrence of the event and the viewer's ability to see the event) are highly desirable. This disclosure describes techniques that may be used to reduce latency, as described in greater detail below.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file, often called a segment in the context of DASH, associated with a given uniform resource locator (URL) or other identifier, e.g., URI. The partial GET operation receives a byte range as an input parameter and retrieves a continuous number of bytes of a file or segment corresponding to the received byte range. Thus, movie fragments may be provided for HTTP streaming, because a partial GET operation can get one or more individual movie fragments within a file or segment. Note that, in a movie fragment, there can be several track fragments of different tracks. In HTTP streaming, a media representation may be a structured collection of data comprising one or more files or segments that represents a timeline of related multimedia content that is accessible to the client for play back. The client may request and download media data information to present a streaming service to a user. Alternatively, DASH segments may be delivered using a broadcast or multicast protocol, such as eMBMS.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Multimedia content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A Representation may be one of a number of alternative encoded versions of audio or video data. The Representations may differ by various characteristics, such as encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group, or adaptation set, which may be indicated by a group or adaptation set attribute in the MPD. Representations in the same adaptation set are generally considered alternatives to each other. For example, each representation of video data for a particular period may be assigned to the same adaptation set, such that any of the representations may be selected for decoding to display video data of the multimedia content for the corresponding period. The media content within one period may be represented by either one representation from adaptation set 0, if present, or the combination of at most one representation from each non-zero adaptation set, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation.

Typically, a segment that conforms to the DASH standard generally has three parts including (1) a fixed header, (2) a table of pointers to data units, and (3) the data units themselves. In an example, a segment may be formed according to Table 1, shown below:

TABLE 1

SEGMENT OF MEDIA DATA

Header
Fixed Table Header
Table of pointers
- Offset of Data Unit 1 = 10
- Offset of Data Unit 2 = 100
- Offset of Data Unit N = . . .
Data Unit 1
Data Unit 2 . . .
Data Unit N A device responsible for transmitting a segment (e.g., a server device) typically cannot transmit a segment header until the sizes of all of the data units are known, so that the device can properly construct the table of pointers. Accordingly, the server device generally assembles the data units and pointers, generates the header, and transmits the fully formed segment as a single unit. Alternatively, in response to partial GET requests, the server may transmit portions (e.g., specified byte ranges) of the segment. However, outside the techniques of this disclosure, the server device would receive partial GET requests only after the segment has been fully formed, e.g., after a media fragment random access (MFRA) box, which is typically placed at the end of a segment, has been constructed. That is, in order for a client device to submit a partial GET request, the client device would need access to data of the MFRA box, or a similar data structure, having indicators of locations of particular portions of the segment, e.g., indications of byte locations of network abstraction layer (NAL) units of a particular type, such as instantaneous decoder refresh (IDR) pictures.

Moreover, a device that receives a segment of media data (e.g., a client device) typically cannot process the segment until the segment header and all of the data units have been received. Accordingly, the client device generally receives a fully formed segment (e.g., with the entire header, table of pointers, and data units) prior to decoding and displaying the segment. Alternatively, a client device may retrieve portions of a segment (e.g., one or more specified byte ranges), using data of the MFRA box, as explained above. However, again, accessing specific byte ranges of a segment by client devices, outside the techniques of this disclosure, is performed only after the segment has been fully formed.

In examples in which an entire segment is formed prior to transmitting the segment over the network (and received prior to decoding), a one segment latency between transmission of the segment and decoding/playback of the segment is introduced. That is, the server device fully forms an entire segment and transmits the segment to the client device. The client device receives the fully formed segment and uses the header data and pointers to decode and display the full segment. Accordingly, a full segment of latency is introduced, as the server device forms a full segment and the client device receives a full segment prior to playback.

In an example, for purposes of illustration, a segment may contain one second of video data, in playback time. That is, a sever device may package (e.g., encode and encapsulate) a full second of video data (that is, an amount of data that, when decoded and played back, can result in a one second playback duration) in a segment and transmit the second-long segment to a client device. The client device then receives the header and all of the data units of the second-long segment and decodes the entire segment prior to displaying the segment. Accordingly, a one second latency may be introduced, as the client device does not begin decoding/playback until the full segment has been received.

Aspects of this disclosure are generally directed to reducing latency associated with streaming one or more segments of media data. In an example, the techniques of this disclosure include optimizing a transmission schedule for a segment of media data. That is, according to aspects of this disclosure a device responsible for transmitting a segment over a network (e.g., a server device, as described in greater detail with respect to FIG. 1 below) may divide media data into a plurality segments that are suitable for transmitting over the network, where the segments are not necessarily independently decodable.

For example, the segments need not include a stream access point (SAP), such as an instantaneous decoder refresh (IDR) picture, a clean random access (CRA) picture, or other such picture associated with random access. Instead, one of the segments may include an SAP, and other segments may include video data that is coded relative to the SAP, e.g., directly relative to the SAP or to other video data coded relative to the SAP. Thus, a content preparation device may produce and send segments quickly, without including SAPs in each of the segments. In this manner, by sending segments that do not include SAPs, the bitrate of a representation coded in accordance with these techniques may remain substantially the same as a bitrate for a representation in which each segment includes an SAP; however, latency may be reduced, because the segments may represent a much shorter playback duration, in accordance with the techniques of this disclosure.

Alternatively, a segment may include a stream access point, but not at the beginning of the segment. In general, a relevant profile may specify times at which IDR pictures are required, in order to allow random access. IDR pictures occurring at times specified by the relevant standard may be considered "forced IDR" pictures. In particular, conventionally, such forced IDR pictures would occur at the beginning of a segment (in decoding order), such that all pictures of the segment can be properly decoded. However, this disclosure recognizes that, at times, a video coding device may insert an unforced IDR picture into a segment, e.g., to accommodate a scene change. That is, a video encoder may determine that intra-coding a picture corresponding to a scene change is more beneficial than inter-coding the picture. This disclosure proposes using such scene change IDR pictures as substitutes for, or in addition to, forced IDR pictures.

That is, when a segment corresponds to a time at which a relevant standard would otherwise dictate that an IDR picture is required at the beginning of the segment (that is, a "forced IDR"), a device in accordance with the techniques of this disclosure may determine whether the segment would include an IDR picture elsewhere in the segment (e.g., a scene change IDR). If so, the device may include only the scene change IDR in the segment, omitting the forced IDR. In this manner, a bit allocation for the segment may be more efficient, and the segment may still effectively satisfy the relevant standard, because a client device can begin decoding data from the scene change IDR of the segment. In addition, data indicating a byte range or byte offset to reach the scene change IDR may be provided, such that a client device may begin a stream from the scene change IDR, to avoid retrieving data of the segment preceding the scene change IDR picture that may not otherwise be decodable (assuming the client device is starting from the scene change IDR).

According to other aspects of this disclosure, a sub-segment may include a sub-segment header and one or more data units. The sub-segment header may include a table of pointers that point to the data units of the sub-segment. As noted above, however, the data units of the sub-segment may refer to a previous sub-segment or a future sub-segment. For example, a data unit of a sub-segment may include a P or B frame (or P or B slice) that references a frame (or slice) of a previous or future sub-segment.

In some examples, such sub-segments may not be independently decodable. That is, one sub-segment may not necessarily be decoded without reference information contained in another sub-segment, which may correspond to a sub-segment that follows the previous sub-segment. In other words, a sub-segment may refer to a future sub-segment. Sub-segments may, however, contain certain information that is independently decodable. For example, sub-segments may contain one or more I-frames of video data that are independently decodable.

According to aspects of this disclosure, a sub-segment may include a sub-segment header and one or more data units. The sub-segment header may include a table of pointers that point to the data units of the sub-segment. As noted above, however, the data units of the sub-segment may refer to a previous sub-segment or a future sub-segment. For example, a data unit of a sub-segment may include a P or B frame (or P or B slice) that references a frame (or slice) of a previous or future sub-segment.

In some examples, each sub-segment may include a sub-segment header. For example, a sub-segment header may include a "fixed" portion, such as video/audio encoding format, quality level, and the like. In some instances, the header data of the segments, as well as the data of the sub-segment headers may not change between segments and/or sub-segments. Accordingly, in some aspects of this disclosure, a server device may set, and a client device may interpret, a value of a flag that indicates whether the header data has changed. For example, a server device may set a flag to "0" to indicate that the segment or sub-segment header includes substantially similar or the same data as a previous segment or previous sub-segment. The server device may set a flag to "1" to indicate that the segment or sub-segment header has changed. Moreover, a client device may receive the flag and interpret whether header data has changed from one segment to another.

Generating a plurality of sub-segments of video data and transmitting the sub-segments as soon as they have been formed/encoded may reduce latency (e.g., latency associated with transmitting, receiving, decoding, and/or displaying media data in a streaming environment). For example, a client device may immediately start decoding at least a portion of a sub-segment upon receiving the sub-segment. That is, while certain data units of a sub-segment may reference data units of other sub-segments that have not yet been received, a client device may immediately start decoding some of the data units (e.g., I-frames contained in a sub-segment). Moreover, the client device is ready to decode and play out an entire segment upon receiving the header for the segment, which typically follows the sub-segments.

In some examples, generating a plurality of sub-segments and transmitting a sub-segment as soon as it has been formed in accordance with aspects of this disclosure may be more efficient than simply reducing overall segment duration. That is, in the example provided above for purposes of illustration, a segment may include one second of video data, which may introduce a full second of latency. That is, a full second of latency may be introduced if the segment is fully formed prior to transmission, and the segment is fully received and decoded prior to playback. One way to reduce the latency may be to decrease the overall duration of the segment. That is, rather than encoding and transmitting a one second segment, the server device may encode and transmit a 500 millisecond segment. Accordingly, in this example, end to end latency may be reduced from one second to 500 milliseconds.

Reducing latency by reducing segment duration, however, may increase the proportion of overhead data in the bitstream (e.g., thereby decreasing efficiency). For example, as noted above, each segment contains a header that contains a fixed portion, as well as a portion that increases in size with the number of video/audio samples generated in the segment duration. As segment duration decreases, the fixed portion of the header begins to contribute to a larger portion (proportionally) of the overhead associated with transmitting the data. Given a certain bit rate, increasing the overhead reduces the overall efficiency, because as fewer bits may be used for the actual media data.

Moreover, in some examples, segment of media data may be constructed to avoid reference to another segment. That is, each segment of multimedia content, in some examples, does not reference data of other segments (e.g., a P frame or B frame of one segment does not reference a frame of another segment), and may therefore be independently decodable. Accordingly, in such examples, when reducing segment duration, the number of I-frames is increased while the number of P-frames and B-frames is reduced. Video data having proportionally more I-frames takes does not take advantage of temporal redundancies, for example, as much as video data having a greater proportion of P- and/or B-frames. Thus, for a given average rate, there may be an inverse relationship between the number of I-frames and the perceptual quality of the displayed video data. That is, video data that has been coded using a variable bit rate can exhibit a higher perceived quality than for video data that has been coded using a more constant bit rate.

Accordingly, aspects of this disclosure may be used to maintain a given segment duration (having a given rate), while also reducing latency. That is, in the one second segment duration example described above, aspects of this disclosure relate to maintaining the one second segment duration while also reducing latency associated with transmitting and decoding/displaying the segment to less than one second. In this way, the perceived quality of the media data may be maintained while also reducing latency.

The techniques of this disclosure may be used for transmitting multimedia data in accordance with DASH or other streaming network protocols via a broadcast network transmission. For example, a server device may prepare segments having a plurality of sub-segments for transmission to one or more client devices via broadcast. A client device may, in some examples, receive a broadcast network transmission that includes sub-segments of a segment, as discussed above.

This disclosure also describes other techniques for reducing latency. In particular, in some examples, the techniques of this disclosure propose utilizing relatively shorter segments (in terms of playback time), but providing stream access points (SAPs) in only a subset of the segments. In this manner, segments can be transmitted as soon as the segments are formed, and a client device can begin decoding and displaying data of the segments as soon as a segment including a SAP has been received. In general, a SAP may correspond to a random access point (RAP), such as an instantaneous decoder refresh (IDR) picture in ITU-T H.264/AVC (Advanced Video Coding). In some examples, open decoder refresh (ODR) pictures or clean random access (CRA) pictures may also be used as stream access points and random access points.

The client device may further receive subsequent segments, which need not necessarily include SAPs, and decode and display data of these subsequent segments, e.g., utilizing data of the SAP of the previous segment (or other frames coded relative to the SAP) for reference. The segments may be structured as conventional segments with conventional segment headers, albeit without necessarily including a SAP. Alternatively, similar techniques to those described herein for modified headers of segments (e.g., flags that indicate whether header data has changed and using headers with fixed portions and varying portions) can also be applied to segments in representations that may or may not include SAPs. Moreover, data of a segment may be coded relative to data of a subsequent segment, in some examples.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, according to certain techniques of this disclosure, one or more of representations 68 may conform to a DASH Low Latency Live profile. That is, one or more of representations 68 may include segments that lack stream access points at the beginning of the segments. For example, one or more segments may lack stream access points entirely, that is, not include any stream access points. Additionally or alternatively, one or more segments may include stream access points at a position other than the beginning of the segments (in decoding order). As explained in greater detail below, this may allow the segments to be formed and sent from content preparation device 20 and/or server device 60 to client device 40 with reduced latency.

Moreover, segments of a representation conforming to the DASH Low Latency Live profile may be relatively shorter than segments of a representation conforming to a DASH Live profile. That is, segments of the DASH Low Latency Live profile may represent a period of playback time that is shorter than the period of playback time represented by segments of a DASH Live profile. Thus, segments of the DASH Low Latency Live profile may be formed and sent faster than segments of the DASH Live profile, which may reduce latency relative to the DASH Live profile.

In some examples, according to some aspects of this disclosure, encapsulation unit 30 may be configured to form sub-segments of data in accordance with the techniques described herein. That is, for example, encapsulation unit 30 may be configured to divide a segment of media data into a plurality of sub-segments. Encapsulation unit 30 may provide a sub-segment to output interface 32 as soon as the sub-segment has been formed. Output interface 32 may then send the sub-segment to client device 40 via network 74.

In such examples, encapsulation unit 30 may generate sub-segments that are not independently decodable. That is, encapsulation unit 30 may generate a sub-segment that may not necessarily be decoded without reference information contained in another sub-segment, which may correspond to a sub-segment that follows the previous sub-segment. In other words, encapsulation unit 30 may form a sub-segment that refers to a future sub-segment.

Encapsulation unit 30 may generate a segment header that applies to all sub-segments of a segment, as well as a sub-segment header for each of the sub-segments included in a segment. As described in greater detail below, the sub-segment header may contain a table of pointers that identify the locations of data units within the sub-segment. Moreover, encapsulation unit 30 may set a flag that indicates whether segment header data has changed (e.g., whether segment header data is different than a previously generated segment).

In some examples, representations 68 may be separated into adaptation sets. As noted above, in some instances, an adaptation set may also be referred to as a "representation group." That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets, in accordance with the techniques of this disclosure. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Aspects of this disclosure are generally directed to minimizing latency associated with streaming one or more segments of media data from server device 60 to client device 40 over network 74. That is, according to aspects of this disclosure, server device 60 may divide a segment of media data into a plurality of sub-segments that are suitable for transmitting over network 74. In this example, server device 60 may transmit a sub-segment as soon as the sub-segment has been formed. That is, server device 60 does not have to wait for more than one sub-segment to be formed prior to transmitting a sub-segment. Moreover, server device 60 does not have to wait for header data for all of the sub-segments to be generated prior to transmitting a sub-segment.

It should be understood that certain functions attributed to server device 60, such as sub-segment formation and/or transmission, may be carried out by one or more other components or devices. That is, in another example, content preparation device 20 may be responsible for forming and sending sub-segments over network 74. Additionally or alternatively, according to some examples, content preparation device 20 and server device 60 may be highly integrated or incorporated into the same device. Thus, content preparation device 20, server device 60, or a combination of such devices may prepare and send sub-segments to a client device, such as client device 40, as soon has the sub-segments have been formed. Moreover, such devices may send the sub-segments in a broadcast or multicast network transmission.

Client device 40 may be configured to receive a sub-segment that has been formed according to aspects of this disclosure and immediately start decoding at least a portion of the sub-segment. That is, while certain data units of the sub-segment may reference data units of other sub-segments that have not yet been received, client device 40 may immediately start decoding some of the data units (e.g., I-frames contained in a sub-segment). Moreover, client device 40 is ready to decode and play out an entire segment upon receiving the header for the segment, which typically follows the sub-segments. That is, client device 40 typically receives all of the sub-segments of a segment prior to receiving the header for the segment.

Generating a plurality of sub-segments of video data and transmitting the sub-segments as soon as they have been encoded may reduce latency associated with transmitting the segments by server device 60, as well as receiving, decoding, and/or displaying the segments by client device 40.

Likewise, in other examples, generating relatively shorter segments may also reduce latency associated with transmitting segments. The presentation times corresponding to these segments may be fixed across representations in an adaptation set, but each segment need not necessarily include a SAP, as discussed herein. In accordance with certain techniques of this disclosure, content preparation device 20 may obtain live media content, that is, record audio and/or video content of an event that is occurring in real time, encode this recorded content, prepare the recorded content for network transport, and send the recorded content to server device 60. Alternatively, content preparation device 20 may deliver the content to client device 40 directly. In any case, content preparation device 20 may form at least segments that do not include SAPs.

As discussed above, content preparation device 20 may be configured to reduce latency associated with broadcast or multicast network transmission by forming segments having shorter temporal durations than conventional segments. For example, whereas conventional segments may include video data representing ten seconds of playback time, content preparation device 20 may form segments that represent only one second of playback time. That is, the video data included within these segments may, when decoded and presented at a corresponding frame rate, correspond to one second of playback. For example, if a corresponding frame rate is 30 frames per second, the segments formed by content preparation device 20 may include data for 30 frames of video data, as well as a corresponding amount of audio data.

As another example, if a corresponding frame rate is 60 frames per second, content preparation device 20 may form segments including coded video data representing 60 frames of video data, as well as corresponding audio data. This is in contrast to segments representing, for example, 10 seconds of playback, which would include coded data representing 300 and 600 frames of video data, respectively, in the examples discussed above.

By reducing the playback duration represented by each segment, content preparation device 20 can send fully formed segments to, e.g., server device 60 or client device 40 faster than if the segments represented a longer playback duration, specifically, when recording a live event. Additionally, because each segment need not include a SAP, a bitstream including shorter segments (that is, segments that represent a relatively short playback duration) may have a substantially similar bitrate as a bitstream including longer segments. In this manner, these techniques may provide advantages related to reducing latency, that is, the amount of time elapsed between the occurrence of an event recorded by content preparation device 20 and the time a viewer of client device 40 is able to observe playback corresponding to the event.

In this manner, content preparation device 20 and server device 60 represent examples of a device for sending multimedia data, the device comprising one or more processors configured to obtain a first segment of media data, wherein the media data of the first segment comprises a first stream access point, send the first segment to a client device, obtain a second, subsequent segment of media data, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, send the second segment to the client device.

Likewise, client device 40 represents an example of a device for receiving media data, the device comprising one or more processors configured to receive a first segment of media data, wherein the media data of the first segment comprises a first stream access point, receive a second segment of media data, wherein the media data of the second segment lacks a stream access point at the beginning of the second segment, and before a second stream access point, subsequent to the first stream access point, is available, decode at least a portion of the media data of the second segment relative to at least a portion of the media data of the first segment.

The first segment, in these examples, may comprise a fully-formed DASH segment (or other media file) including a stream access point, e.g., an instantaneous decoder refresh (IDR) picture, a clean random access (CRA) picture, or the like (e.g., any intra-coded picture (I-picture)). The second segment may also comprise a fully-formed DASH segment, without including such a stream access point. In this manner, portions of the second segment may be coded (e.g., encoded or decoded) relative to a portion of the first segment. For example, one or more pictures in the second segment may be inter-prediction mode coded relative to a picture of the first segment, such as the stream access point or a picture coded relative to the stream access point. In this manner, one or more pictures of the second segment may use one or more pictures of the first segment as reference pictures.

In this manner, the second segment need not include a stream access point. Although this may render the second segment not independently decodable (due to references to the first segment), this also allows the first segment to be coded, encapsulated, and sent quickly, thereby reducing latency (that is, delay between when an event occurs and when a user of client device 40 is able to observe the event). For example, content preparation device 20 and/or server device 60 may send the first segment before obtaining enough data for the second segment, e.g., before capturing, encoding, and encapsulating the second segment.

It should be understood that the terms "first" and "second" used above are intended as nominal references, and not ordinal references. That is, the "first segment" need not in fact be the ordinal first segment of the multimedia data, but may instead be any segment including a stream access point of the multimedia segment. Likewise, the second segment need not immediately follow the first segment, but may instead correspond to any segment that follows the first segment in decoding order that includes a portion that is coded relative to a portion of the first segment. The first and second segments may, but need not, represent the same playback duration, e.g., approximately one second of playback time (also referred to as presentation time).

Figure 2:
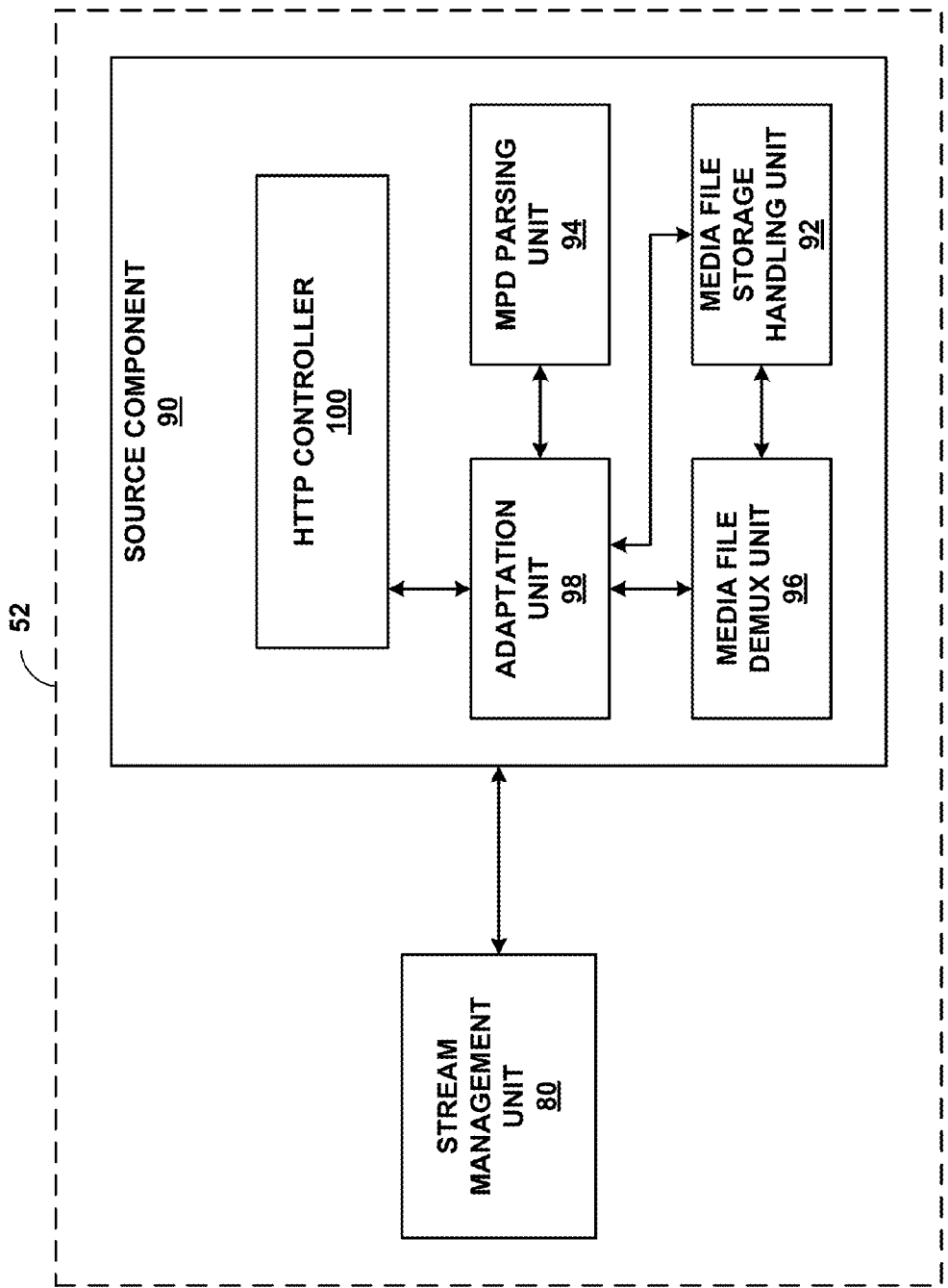
FIG. 2 is a block diagram illustrating an example retrieval unit, according to aspects of this disclosure.

FIG. 2 is a block diagram illustrating example components associated with retrieval unit 52. Retrieval unit 52 of FIG. 2 may correspond to retrieval unit 52 (FIG. 1) or be included in another, different retrieval device. In this example, retrieval unit 52 includes stream management unit 80 and source component 90. Source component 90 includes media file storage handling unit 92, MPD parsing unit 94, media file demultiplexing (demux) unit 96, and adaptation unit 98 and HTTP controller 100.

In general, retrieval unit 52 may include hardware and/or software for communicating using specific communication protocols or interacting with specific physical media. For example, retrieval unit 52 may implement HTTP and receive data using the HTTP stack, which may include TCP/IP as well as other communication protocols for other layers of the network. Retrieval unit 52 may further generate HTTP GET or partial GET requests for segments (or portions of segments) from, e.g., server device 60. Retrieval unit 52 may also implement a broadcast or multicast protocol, such as eMBMS or IP multicast, to receive data from broadcast or multicast network transmissions. Retrieval unit 52 may be configured to subscribe to a broadcast or multicast network transmission in order to retrieve data of the transmission.

Source component 90 may receive data of multimedia content from one or more sources. Initially, source component 90 may receive a manifest file, such as an MPD file. MPD parsing unit 94 may parse the MPD file to determine available representations of the multimedia content, as well as adaptation sets including groups of the representations with common characteristics, and characteristics of the representations. Occasionally, source component 90 may receive an updated MPD for the current multimedia content, in which case MPD parsing unit 94 may parse the updated MPD and provide the updated information to stream management unit 80. In some examples, source component 90 may select at least one of the representations, while in other examples, source component 90 may provide the representation information to stream management unit 80. In such examples, stream management unit 80 may select at least one of the representations. In any case, source component 90 may send a request to stream management unit 80 to send download information for retrieving data for the multimedia content.

Stream management unit 80 may be configured to select a source from which to retrieve data of the selected representation. Stream management unit 80 may, in some examples, receive certain notifications indicating that stream management unit 80 is to select a particular source from which to retrieve the data. For example, an HTTP receiver and stack may provide an estimated amount of available network bandwidth to stream management unit 80 for HTTP transmissions. A broadcast receiver and stack may provide indications of whether a URL for a broadcast transmission corresponding to the selected representation is available and whether the broadcast is in coverage. A local storage device may provide an indication of whether a URL is available for locally stored data corresponding to the selected representation. In addition, stream management unit 80 may receive radio signal strength information (RSSI) from one or more radios of a wireless device, such as client device 40, to determine the strength of a radio signal, e.g., for receiving network data.

Stream management unit 80 may analyze the source notifications received to select one or more of the sources from which to retrieve data for the multimedia content. In some examples, stream management unit 80 also selects a representation of the multimedia content. Stream management unit 80 may receive information from source component 90, such as representation characteristics extracted from an MPD file and URLs for segments of the representations. The information may further include indications of buffer occupancy and/or available space, as well as a current playback time of the multimedia content. Using this information, along with received source notifications, stream management unit 80 may select a source from which to retrieve data for the multimedia content, e.g., data of a currently selected representation. Stream management unit 80 may adaptively switch between representations and/or sources from which to retrieve data for the representations over time for the same multimedia content.

Stream management unit 80 may provide indications of a selected source (and in some cases, a selected representation) to source component 90. In addition, stream management unit 80 may formulate a download command including information for retrieving data of the selected representation from the selected source. For example, the download command may include an indication of a source type and source-specific information. For example, for HTTP/1.1, the download command may specify the full path of a URL of a segment of the selected representation to be included in a GET or partial GET command. As another example, for a broadcast or multicast network transmission, the download command may specify the network address of a broadcast or multicast group to receive a segment of the selected representation. In this manner, stream management unit 80 may determine an appropriate source from which to retrieve data, as well as an appropriate segment of a representation to receive, based on information received from source component 90 and/or other received information.

Source component 90 may formulate an appropriate command to retrieve the data of the selected representation from the selected source, based on the download command information received from stream management unit 80. For example, source component 90 may generate an HTTP GET or partial GET request, a request to join a broadcast or multicast group, or a request to retrieve data of a local storage medium.

In the example of FIG. 2, source component 90 includes media file demultiplexing (demux) unit 96, which may demultiplex the received data, e.g., into respective audio and video streams. Media file storage handling unit 92 may buffer received data in a memory (not shown) of a device including retrieval unit 52. Media file storage handling unit 92 may also provide demultiplexed data to, e.g., audio decoder 46 and video decoder 48 (FIG. 1). Alternatively, media file storage handling unit 92 may provide retrieved media data to client device 40 without demultiplexing the data.

Accordingly, retrieval unit 52 may be configured to operate according to different communication protocols. For example, retrieval unit 52 may comprise a network interface configured to operate according to transmission control protocol/Internet protocol (TCP/IP). The same network interface (e.g., a different element of the network interface), or a different interface, may be configured to receive data according to IP multicast or eMBMS, or other broadcast or multicast network protocols. Another interface of retrieval unit 52 may be configured to receive data from a physical medium. Such an interface may comprise a universal serial bus (USB) interface, a DVD reader, a Blu-ray player, or other such interfaces for retrieving data from a physical medium.

In examples in which retrieval unit 52 is receiving data according to HTTP, adaptation unit 98 may communicate with HTTP controller 100 to perform bandwidth adaption. For example, adaptation unit 98 may communicate with HTTP controller 100 and select, from a manifest file for multimedia content, a representation from which to retrieve multimedia data of the multimedia content. The manifest file may include information indicative of a plurality of representations of the multimedia content, and the plurality of representations may include the selected representation. In particular, the manifest file may include information describing bitrates of the representations, such that adaptation unit 98 may select an appropriate representation based on bitrates of the representations given a currently available amount of network bandwidth. Of course, it should be understood that as explained above, a stream management unit may also be configured to select the representation, rather than the source component. Moreover, source component 90 and stream management unit may 80 be functionally integrated, in some examples.

In accordance with the techniques of this disclosure, source component 90 may be configured to receive broadcast or multicast network data. For example, source component 90 may buffer data received according to broadcast or multicast in a memory (not shown) via media file storage handling unit 92. Adaptation unit 98 may determine a source from which to retrieve a subsequent segment, e.g., based on measured bandwidth, and determine that the bandwidth of the source corresponding to the buffered data is effectively infinite, and thus, determine to retrieve the data from the buffer. The data received via broadcast or multicast may include a first segment representing coded video data including a stream access point, and a second segment representing coded video data that lacks a stream access point at the beginning of the second segment. Media file demux unit 96 may demultiplex the first and second segments into corresponding media streams, such as audio and video packetized elementary streams, and provide packets of these elementary streams to audio decoder 46 and video decoder 48, respectively.

Figure 3:
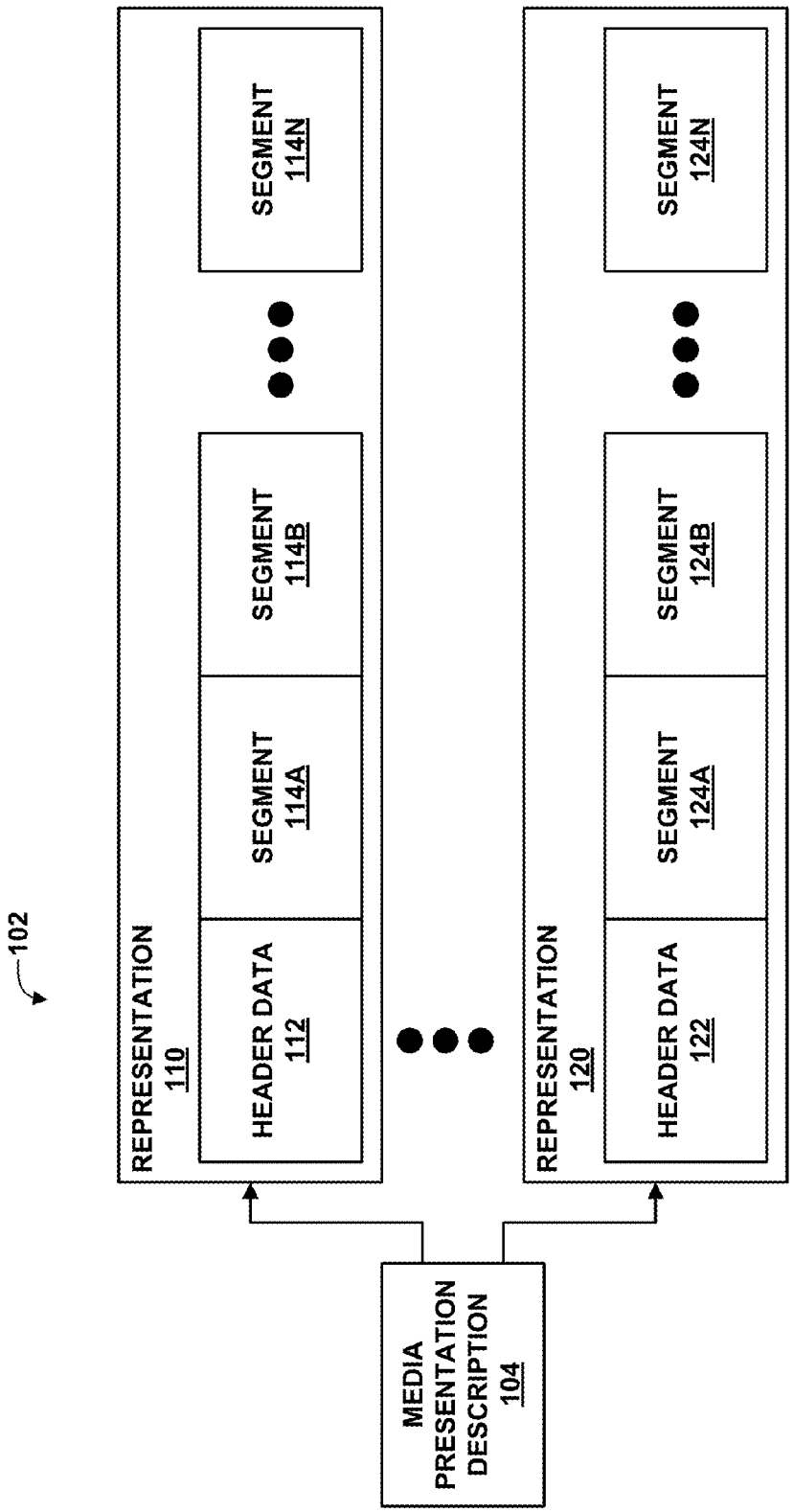
FIG. 3 is a conceptual diagram illustrating elements of an example multimedia content.

FIG. 3 is a conceptual diagram illustrating elements of an example multimedia content 102. Multimedia content 102 may correspond to multimedia content 64 (FIG. 1), or another multimedia content stored in memory 62. In the example of FIG. 3, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 3. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Figure 4:
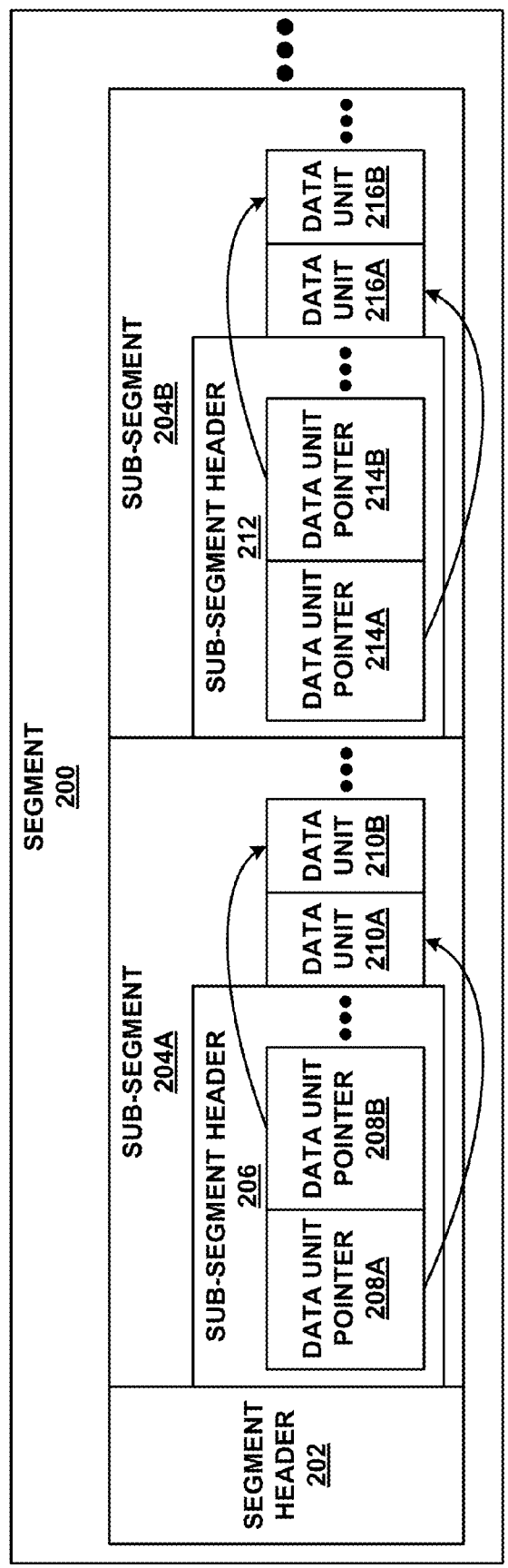
FIG. 4 is a block diagram illustrating an example segment of video data, according to aspects of this disclosure.

According to some aspects of this disclosure, each of segments 114, 124 may be further divided into a plurality of sub-segments, as shown and described with respect to FIG. 4. After multimedia content 102 has been fully formed, header data 112, 122 may, in some examples, include pointers to particular NAL units, such as IDR NAL units, as discussed above. However, when sub-segments of representations 110, 120 are transmitted once the sub-segments are prepared, in accordance with the techniques of this disclosure, it should be understood that header data 112, 122 may not be available until after segments 114, 124 have been fully formed. Nevertheless, as discussed in this disclosure, data of sub-segments of segments 114, 124 may be transmitted before header data 112, 122 is available.

In other examples, each of segments 114, 124 may include a conventional segment header, without being divided into sub-segments. However, one or more of segments 114, 124 need not necessarily include a random access point, also referred to as a stream access point (SAP). A client device (such as client device 40 of FIG. 1) may be configured to begin receiving data of one of representations 110-120 at a segment that includes a SAP, but one or more subsequent segments of the representation need not necessarily include a SAP. For example, the client device may submit a request to join a multicast group, and receive a segment (e.g., a first segment) including a SAP after submitting the request. The client device may also receive another segment (a second segment) of the multicast group following the first segment, but the second segment need not include a SAP. Instead, the second segment may include at least some data that is coded relative to the first segment.

For example, suppose segment 114A includes a SAP, but segment 114B does not include (that is, lacks) a SAP. In particular, in this example segment 114B is entirely devoid of a SAP. Client device 40 (FIG. 1) may begin receiving data of representation 110 at segment 114A, and begin decoding the data at the SAP of segment 114A. Client device 40 may also retrieve segment 114B, e.g., while decoding data of segment 114A. In such examples, segments of representations may represent relatively short periods of playback time (e.g., one second of playback time).

Content preparation device 20 may construct representations 110-120 such that SAPs are aligned across representations 110-120 within an adaptation set. SAPs need not necessarily occur with the same frequency in each adaptation set, but may be aligned. For example, representation 110 may be constructed to include SAPs at one-second intervals, whereas representation 120 may be constructed to include SAPs at two-second intervals, where the temporal intervals correspond to presentation time. Assuming that representations 110 and 120 are included within the same adaptation set, segments 114A and 124A may begin with SAPs, segment 114B may include a SAP, and segment 124B need not include a SAP. A segment following segment 114B (e.g., segment 114C, not shown in FIG. 3) may also include a SAP, and a segment following segment 124B (e.g., segment 124C, also not shown in FIG. 3) may include a SAP. In other examples, all SAPs of representations in the same adaptation set may be aligned, such that SAPs occur in each of the representations at the same frequency (that is, with the same temporal duration in terms of playback time), as well as being phase-aligned, such that SAPs occur at the same presentation time in each of the representations of the same adaptation set.

Constructing representations of the same adaptation set such that SAPs are aligned across these representations may provide certain advantages. For example, such representations may provide seamless and simple rate adaptation capability. Also, aligning SAPs in representations of the same adaptation set may avoid degradation of video encoding quality.

Moreover, content preparation device 20 may provide variable times between consecutive SAPs. Content-dependent SAP positioning may produce relatively higher quality video, and may provide better compression characteristics. Content preparation device 20 may be configured with a maximum time separation between consecutive SAPs. Moreover, content preparation device 20 may signal the maximum time between consecutive SAPs, e.g., in MPD 104 or representation header data, such as header data 112, 122.

In some examples, each of segments 114, 124 may have a fixed duration. In such examples, segments 114, 124 need not necessarily begin with a SAP. Each of segments 114, 124 may represent the same amount of presentation time in such examples, e.g., one second (or other appropriate presentation times). These examples may also provide certain advantages. For example, assuming that URLs for segments can be generated in an automated fashion as a function of the playback time, procedures for predicting the segment URL may be relatively simple. Fewer segments may ultimately be required. On the other hand, content preparation device 20 may provide segment indexing for switching between representations of an adaptation set.

FIG. 4 is a conceptual diagram illustrating an example segment 200, according to one aspect of this disclosure. Segment 200 may correspond to segments 114 and/or 124 shown in FIG. 3, and may comprise at least a portion of multimedia content 64 (FIG. 1), or another multimedia content stored in memory 62. While certain aspects of FIG. 4 may be described with respect to the components shown in FIG. 1, it should be understood that segment 200 may be implemented in a number of different environments having a number of different components.

In the example of FIG. 4, segment 200 includes segment header 202, sub-segment 204A, sub-segment 204B (referred to collectively as sub-segments 204), as well as potentially a number of additional sub-segments (indicated by ellipsis). According to aspects of this disclosure, segment header 202 may include information common to all sub-segments 204 of segment 200. For example, segment header 202 may include certain information to assist a device, such as client device 40, in decoding and/or rendering segment 200. That is, segment header 202 may include data that indicates an encoding format for audio data of the segment 200, an encoding format for video data of the segment 200, a bitrate for the segment 200, a quality level for the segment 200, a resolution of the video data of the segment 200, a frame rate of the video data of the segment 200, and the like. According to some aspects of this disclosure, a portion of such data may be included in a sub-segment header, as described below. In some examples, segment header 202 is transmitted after all sub-segments 204 have been transmitted. In other examples, segment header 202 is transmitted before sub-segments 204 have been transmitted.

In some examples, according to aspects of this disclosure, segment header 202 may include a flag that indicates whether the data of segment header 202 has changed. That is, a segment header flag may indicate whether data of segment header 202 has changed from a previously received and decoded segment header. A device, such as sever device 60, may set a segment header flag to "0" to indicate that the data of segment header 202 has not changed, and may set the segment header flag to "1" to indicate that the data of the segment header has changed. In the event that the header data has not changed (flag=0), server device 60 may omit inclusion of additional information in segment header 202. Alternatively, in the event that the header data has changed (flag=1), server device 60 may include the header data after the segment header flag.

In the example shown in FIG. 4, sub-segment 204A includes sub-segment header 206 having data unit pointers 208A and 208B (collectively, data unit pointers 208) that identify the relative location of data units 210A and 210B (collectively, data units 210), respectively. In some examples, sub-segment header 206 may include a portion of the data described above with respect to segment header 202. Data that does not frequently change, however, is not typically included sub-segment header 206 (e.g., such as encoding format).

According to some aspects of this disclosure, sub-segment header 206 includes a table of data unit pointers 208 that identify an offset of each of the data units 210 within sub-segment 204A. For example, the offset may provide the relative position of the data units within the sub-segment 204A. The offset may also provide an indication of the appropriate order in which to present decoded data of the data unit (although in some examples data units may not be encoded and transmitted in presentation/display order).

Data units 210 generally include non-VCL NAL units or VCL NAL units, which may include encoded media data. In an example in which the media data is video data, data units 210 may include frames or slices of video data. According to aspects of this disclosure, a sub-segment, such as sub-segments 204A, may not be independently decodable. For example, one or more of data units 210 may refer to one or more data units contained in one or more other sub-segments (e.g., such as data units 216 of sub-segment 204B). That is, in an example in which data units 210 include video data, one or more of data units 210 may be encoded as a P-frame or a B-frame that references video data of one or more data units contained in one or more other sub-segments. Thus, in some examples, one or more of data units 210 may refer to a future sub-segment (e.g., a B-frame). Data units 210, however, may also contain certain information that is independently decodable (e.g., without reference to other sub-segments). For example, one or more of data units 210 may be I-frames of video data that are independently decodable.

In the example shown in FIG. 4, sub-segment 204B is configured similarly to sub-segment 204A. That is, sub-segment 204B includes sub-segment header 212 that has data unit pointers 214A and 214B that identify data units 216A and 216B. In some examples, according to aspects of this disclosure, similar to segment header 202 described above, sub-segments 204 may include a flag that indicates whether the data of sub-segment header 206, 212 has changed. In the example shown in FIG. 4, sub-segment header 212 may include a flag that indicates whether data of the previously received sub-segment header 206 has changed (e.g., flag=0, data has not changed; flag=1, data has changed). Accordingly, in examples in which sub-segment header data does not change, the number of bits consumed by header data can be reduced.

Utilizing segment 200 in accordance with the techniques described herein can result in reduced latency (e.g., compared to a segment that does not include a plurality of sub-segments). That is, according to aspects of this disclosure, sure a device responsible for transmitting a segment over a network, such as sever device 60 or content preparation device 20 (or a device implementing functionality of both server device 60 and content preparation device 20), may transmit sub-segment 204A as soon as sub-segment 204A has been formed (e.g., as soon as the last data unit of sub-segment 204A is received/encoded). That is, server device 60 does not have to wait for multiple sub-segments to be formed prior to transmitting sub-segment 204A. Moreover, server device 60 does not have to wait for segment header 202 to be completed prior to transmitting sub-segment 204A.

Transmitting sub-segments 204 as soon as the sub-segments 204 have been formed/encoded may reduce latency, because a client device, such as client device 40, may immediately start decoding at least a portion of sub-segments 204 upon receiving sub-segments 204. That is, in the example shown in FIG. 4, while certain data units 210 of sub-segment 204A may reference one or more data units 216 of sub-segment 204B, a client device may immediately start decoding some of the data units 210 of sub-segment 204A (e.g., I-frames contained in sub-segment 204A). Moreover, client device 40 is ready to decode and play out the entire segment 200 upon receiving the segment header 202 for the segment 200, which typically follows the sub-segments 204A, 204B. That is, client device 40 has already received and the sub-segments 204A and 204B and is ready to begin decoding immediately upon receiving segment header 202.

In accordance with the techniques of this disclosure, in an example, segment 200 may be arranged according to Table 2, shown below:

TABLE 2

SEGMENT HEADER WITH SUB-SEGMENTS

Header
- Fixed Table Header
Sub-segment Header 1
- Offset to Data Unit 1
- Offset to Data Unit 2
Data Unit 1
Data Unit 2
Sub-segment Header 2
- Offset to Data Unit 3
- Offset to Data Unit 4
Data Unit 3
Data Unit 4

According to some aspects of this disclosure, segment 200 may be configured for transmitting multimedia data in accordance with DASH or other streaming network protocols via a broadcast network transmission. For example, server device 60 may prepare segment 200 having a plurality of sub-segments 204 for transmission to one or more client devices 40 via broadcast. Client device 40 may, in some examples, receive a broadcast network transmission that includes sub-segments 204 of segment 200, as discussed above.

While FIG. 4 illustrates sub-segments 204A and 204B as being similarly configured, it should be understood that in some examples, segments of a representation may not include similarly configured segments. For example, a representation may include one or more segments that have been divided into sub-segments, as well as one or more sub-segments that are not divided.

Figure 5:
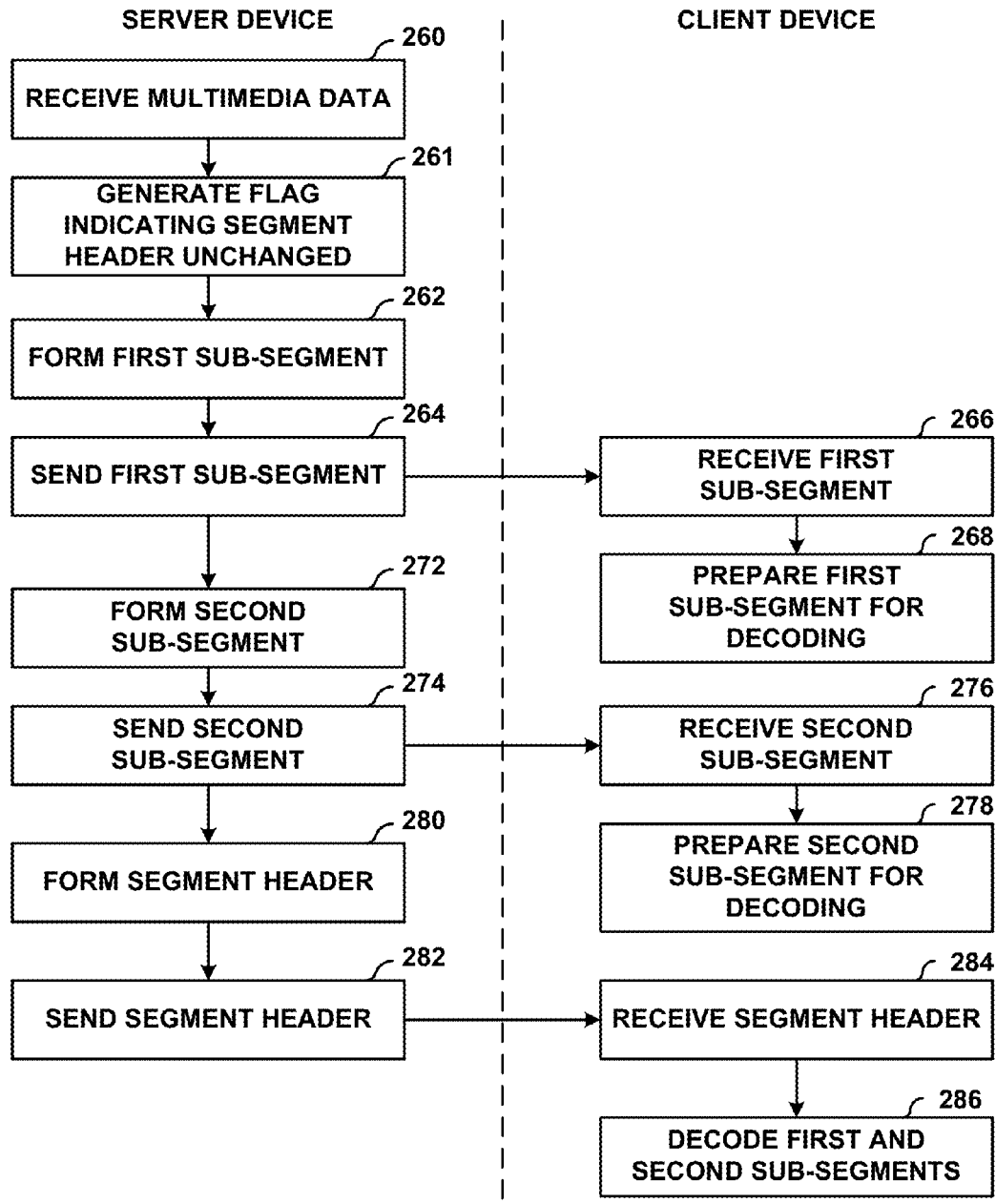
FIG. 5 is a flowchart illustrating an example method for performing techniques of this disclosure.

FIG. 5 is a flowchart illustrating an example method according to the techniques described in this disclosure. Although the method of FIG. 5 is described with respect to content preparation device 20 and client device 40 (FIG. 1), it should be understood that other devices may implement techniques similar to those of the method of FIG. 5. For example, server device 60, or one or more network devices of a content delivery network, may perform some or all of the functions attributed to server device 60.

Content preparation device 20 (which may be generally referred to as a "server device" in that it may provide content to a client device) may initially obtain data for a representation of multimedia content (260). More specifically, content preparation device 20 may obtain a segment of media data for a given representation of multimedia content. According to some aspects of this disclosure, content preparation device 20 may generate a flag that indicates whether header data associated with the segment of media data has changed (261). That is, content preparation device 20 may indicate whether header data of the segment is different than header data of a previously encoded segment (if such a segment exists). Content preparation device 20 may set a segment header flag to a value of "0" to indicate that header data is unchanged, or may set a segment header flag to a value of "1" to indicate that header data is different (e.g., followed by the appropriate header data).

Content preparation device 20 may then form a first sub-segment (262). For example, content preparation device 20 may form a sub-segment similar to sub-segments 204 shown in FIG. 4, having a sub-segment header that includes data unit pointers identifying one or more data units contained in the first sub-segment. In addition, as noted above, the sub-segment may not be independently decodable. That is, the first sub-segment may include one or more data units that reference one or more data units of one or more other sub-segments (as well as future sub-segments, such as the second sub-segment described below).

Once formed, content preparation device 20 sends the first sub-segment to client device 40 (264). According to an aspect of this disclosure, content preparation device 20 may broadcast the first sub-segment (as well as following sub-segments). After content preparation device 20 has transmitted the first sub-segment, client device 40 receives the first sub-segment (266). In some examples, client device 40 may prepare the first sub-segment for decoding (268). For example, client device 40 may buffer or otherwise prepare the first sub-segment for decoding such that the first sub-segment may be decoded immediately upon receiving segment header data.

In addition, content preparation device 20 forms the second sub-segment (272). The second sub-segment may be formed in a manner similar to the first sub-segment described above. After formation, content preparation device 20 may send the second sub-segment (with sub-segment header data) to client device 40 (274). Client device 40 then receives the second sub-segment (276). In some examples, client device 40 may prepare the second sub-segment for decoding in a manner similar to that described above with respect to the first sub-segment (278).

After forming and transmitting the second sub-segment, content preparation device 20 may form a segment header that is applicable to all of the sub-segments (e.g., in the example shown in FIG. 5, the first and second sub-segments) (280). Content preparation device 20 may also send the segment header to client device 40 (282). Client device 40 may then receive the segment header (284) and decode the first and second sub-segments (286). That is, client device 40 may decode each of the previously received sub-segments.

In this manner, the method of FIG. 5 represents an example of a method including receiving a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after receiving the first sub-segment, receiving the second sub-segment, the second sub-segment comprising a second set of one or more data units and a second header including data indicative of locations of the data units within the second sub-segment, and processing the segment after receiving the first sub-segment and the second sub-segment.

In addition, the method of FIG. 5 represents an example of a method including sending a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after sending the first sub-segment, sending the second sub-segment, the second sub-segment comprising a second set of one or more data units and a second header including data indicative of locations of the data units within the second sub-segment.

It should also be understood that the steps shown and described with respect to FIG. 5 are provided as merely one example. That is, the steps of the method of FIG. 5 need not necessarily be performed in the order shown in FIG. 5, and fewer, additional, or alternative steps may be performed. In an example, the method shown and described with respect to FIG. 5 includes first and second sub-segments. In other examples, however, a server device may prepare (and a client device may receive) more than two sub-segments of media data.

As discussed above, in some examples, sub-segments may be used to reduce end-to-end latency. In other examples, full segments may be used, but one or more segments need not include a stream access point (SAP). A SAP is generally a point in a bitstream at which a client device, such as client device 40 (FIG. 1) can begin retrieving the bitstream and successfully decode and render the retrieved data. In this manner, a SAP may include data similar to a random access point (RAP) of files, such as files in accordance with the ISO Base Media File Format and extensions thereof. A SAP may include data for an IDR picture at the VCL layer. In accordance with some examples of the techniques of this disclosure, one or more segments of a representation may include full, conventional segment headers, yet need not include a corresponding SAP.

Figure 6:
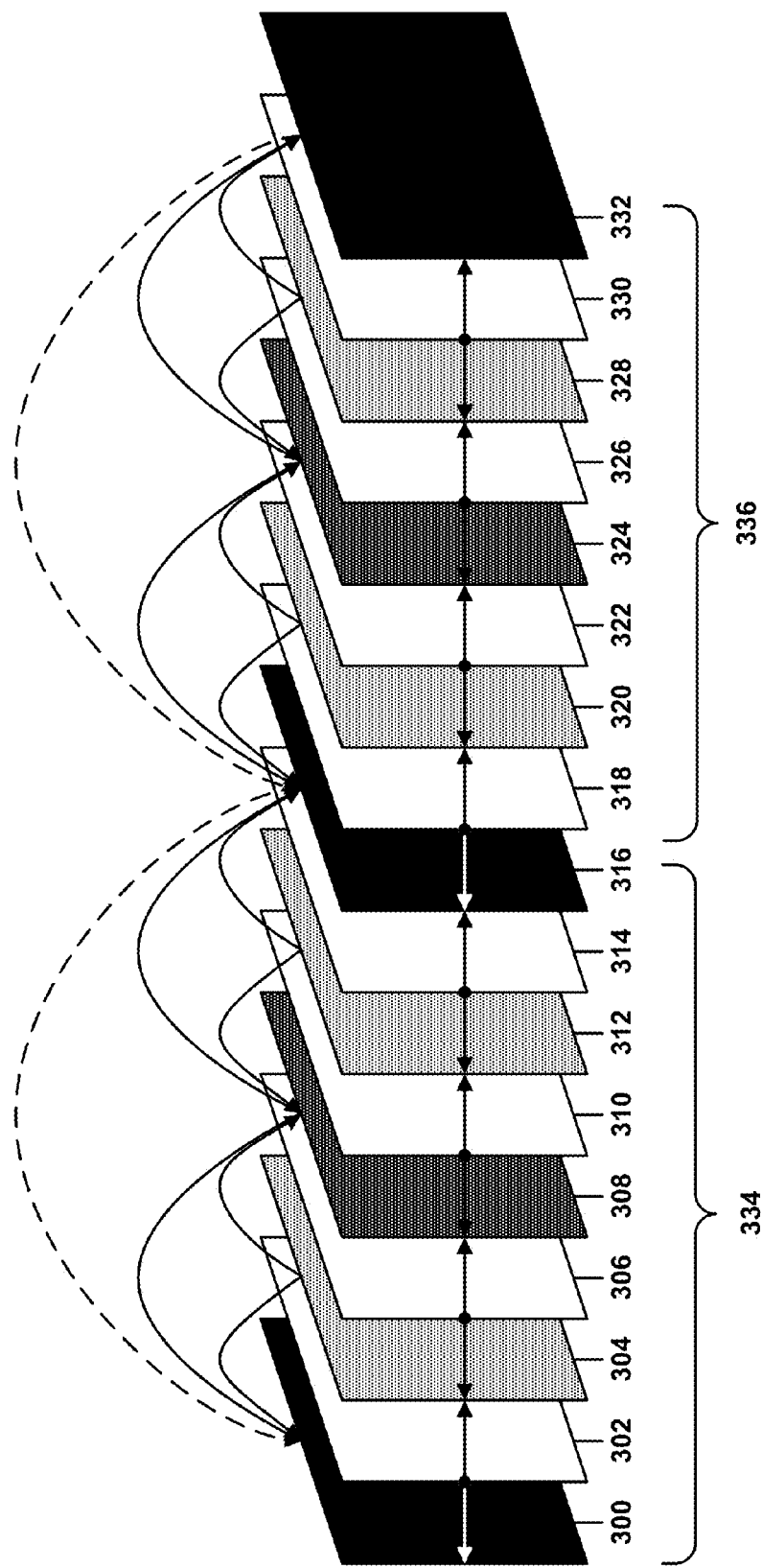
FIG. 6 is a conceptual diagram illustrating a sequence of coded video frames and segments including video frames.

FIG. 6 is a conceptual diagram illustrating a sequence of coded video frames 300-332. FIG. 6 also indicates that frames 300-316 are included in segment 334, while frames 318-332 are included in segment 336, in this example. The frames are shaded differently to indicate relative positions within a hierarchical prediction structure. For example, frames 300, 316, and 332 are shaded black to represent that frames 300, 316, 332 are at the top of the hierarchical prediction structure. Frames 300, 316, 332 may comprise, for example, intra-coded frames, or inter-coded frames that are predicted from other frames in a single direction (e.g., P-frames). When intra-coded, frames 300, 316, 332 are predicted solely from data within the same frame. When inter-coded, frame 316, for example, may be coded relative to data of frame 300, as indicated by the dashed arrow from frame 316 to frame 300.

Frames 308, 324 are darkly shaded to indicate that they are next in the encoding hierarchy following frames 300, 316, and 332. Frames 308, 324 may comprise bi-directional, inter-mode prediction encoded frames. For example, frame 308 may be predicted from data of frames 300 and 316, while frame 324 may be predicted from frames 316 and 332.

Frames 304, 312, 320, and 328 are lightly shaded to indicate that they are next in the encoding hierarchy following frames 308 and 324. Frames 304, 312, 320, and 328 may also comprise bi-directional, inter-mode prediction encoded frames. In general, frames that are lower in the encoding hierarchy may be encoded relative to any of the frames higher in the encoding hierarchy, so long as the frames are still stored in a reference frame buffer. For example, frame 304 may be predicted from frames 300 and 308, frame 312 may be predicted from frames 308 and 316, frame 320 may be predicted from frame 316 and 324, and frame 328 may be predicted from frame 324 and 332. In addition, it should be understood that blocks of frame 304 may also be predicted from frame 300 and frame 316. Likewise, it should be understood that blocks of frame 312 may be predicted from frames 300 and 316.

Frames 302, 306, 310, 314, 318, 322, 326, and 330 are white to indicate that these frames are lowest in the encoding hierarchy. Frames 302, 306, 310, 314, 318, 322, 326, and 330 may be bi-directional, inter-mode prediction encoded frames. Frame 302 may be predicted from frames 300 and 304, frame 306 may be predicted from frames 304 and 308, frame 310 may be predicted from frames 308 and 312, frame 314 may be predicted from frames 312 and 316, frame 318 may be predicted from frame 316 and 320, frame 322 may be predicted from frames 320 and 324, frame 326 may be predicted from frames 324 and 328, and frame 330 may be predicted from frames 328 and 332.

Frames 300-332 are illustrated in display order. That is, following decoding, frame 300 is displayed before frame 302, frame 302 is displayed before frame 304, and so on. However, due to the encoding hierarchy, frames 300-332 may be decoded in a different order. In order to properly decode frame 308, for example, frame 316 may need to be decoded first, in order to act as a reference frame for frame 308. Likewise, frame 308 may act as a reference frame for any of frames 302-306 and 310-314, and therefore may need to be decoded before frames 302-306 and 310-314.

Accordingly, encoded versions of frames 300-332 may be arranged in a relative decoding order in a bitstream including encoded data for frames 300-332. For example, frames 300-316 may be arranged within segment 334 in the following order: 300, 316, 328, 304, 312, 302, 306, 310, 314. Similarly, frames 318-332 may be arranged within segment 336 in the following order: 332, 324, 320, 328, 318, 322, 326, 330. Other ordering arrangements are also possible.

The time at which a frame is displayed may be referred to as presentation time or a display time, whereas the time at which the frame is decoded may be referred to as decoding time. Presentation/display times generally provide indications of temporal ordering relative to other frames of the same sequence. Video encoder 20 may assign a value, referred to as a picture order count (POC) value, to a frame, representative of the display time (or presentation time) of the frame. Accordingly, video decoder 30 may use the POC values of frames to determine the presentation ordering of the frames following decoding.

For purposes of example, assume that frame 300 is intra-coded. In this manner, frame 300 may correspond to a SAP for a bitstream, e.g., a representation of multimedia content. In accordance with some examples of this disclosure, segment 334 may be formed such that segment 334 includes frames 300-316. Moreover, in some examples, segment 336 may be formed that includes frames 318-332. Frame 316 may be coded as a P-frame relative to frame 300. As discussed above, frame 332 may be inter-coded, e.g., as a P-frame relative to frame 316. Nevertheless, segment 336 may be formed such that segment 336 includes frames 318-332. Assuming that frame 332 is not a SAP because frame 332 is inter-coded, segment 336 represents an example of a segment that lacks a SAP.

Providing a segment, such as segment 336, that lacks a SAP may provide several advantages, e.g., in a live streaming environment. Segments may be provided (e.g., by content preparation device 20) in a live streaming environment such that the segments correspond to relatively short playback times (e.g., one second of presentation time). Each of the segments may be made available as a file to content servers, such as server device 60, for distribution to clients, such as client device 40, as soon as content preparation device 20 has formed the segment and made the segment available.

Not all segments necessarily need to contain a SAP. Content preparation device 20 may be configured to place SAPs in the bitstream in a manner that is content-driven (e.g., to make the bitstream more efficient in terms of compression). Content preparation device 20 may further be configured with a specified maximum presentation time difference between consecutive SAPs, e.g., 5 seconds (in terms of presentation time). The sequence of segments may have the property that a client device, such as client device 40, can start playing out the bitstream starting at any SAP, and can play out the bulk of the video contained in each segment at the client device as soon as the segment is available at the client device.

As another example, a video frame sequence (in decode or send order) may be I, P, B, B, P, B, B, P, B, B, P, B, B, I, and so on. The first segment may contain the first four frames, the second segment may contain the next three frames, the third segment may contain the next three frames, the fourth segment may contain the next three frames, and then the fifth segment may start with the second I-frame in this example sequence. The client device can start playing back the first four frames from receiving the first segment, can continue to play back the next three frames from receiving the second segment, can play back the next three frames from receiving the third fragment, can play back the next three frames from receiving the fourth fragment.

Thus, the end-to-end latency in this example can be as little as four frames, that is, those frames contained in the first segment, as the client can potentially begin to play out the first segment when the second segment is just starting to be formed at the encoder side. Furthermore, the streaming can continue smoothly once the client device starts play back, as each segment can be available in time for play back when the frames in the previous segment have been played back. However, the tune-in delay for a client in this example can be much more than four frames, as a client that joins the stream and wants to start at a presentation time after that of the first I-frame but before the second I-frame will typically only start playback after receiving the fifth segment.

Figure 7:
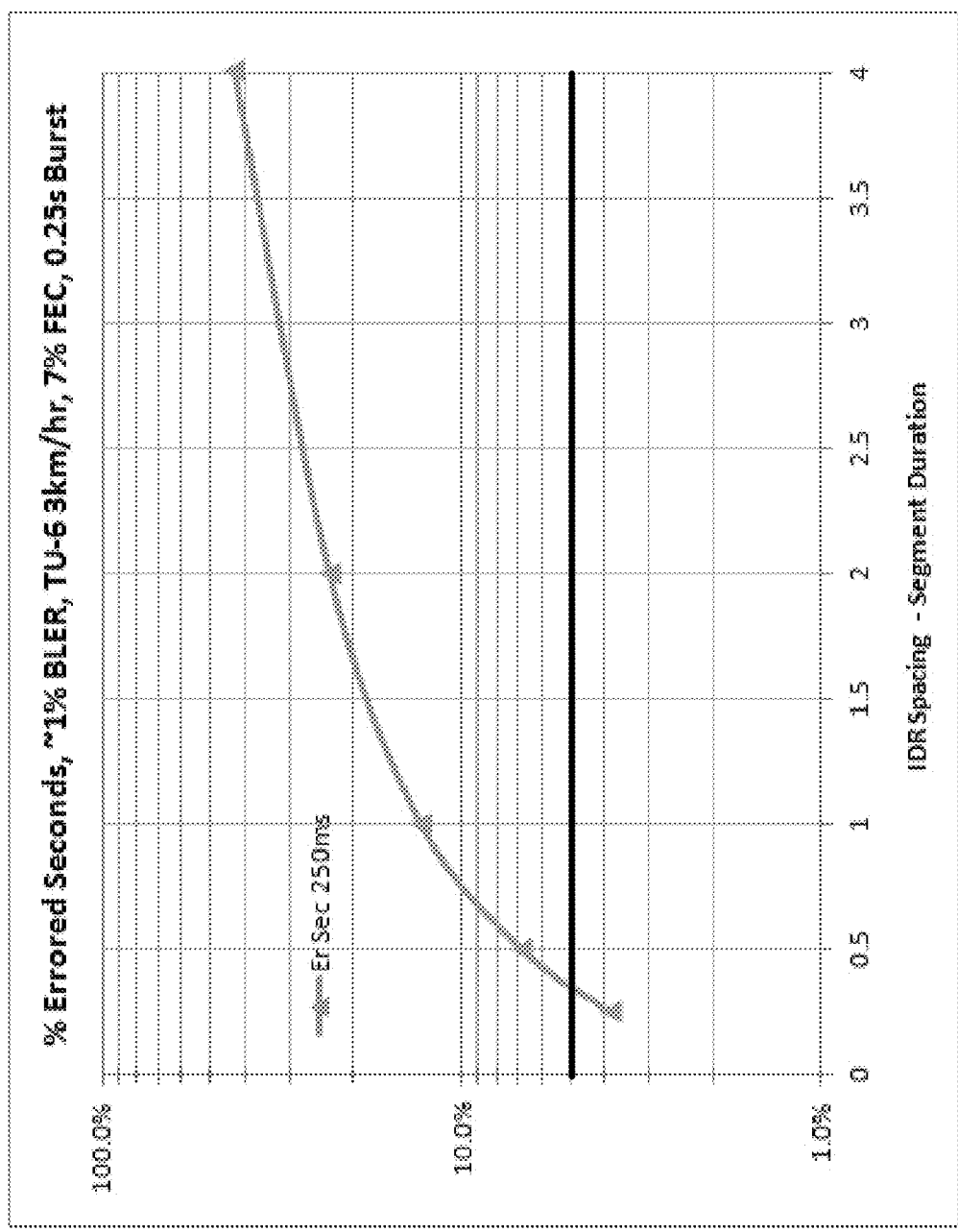
FIG. 7 is a graph illustrating empirical testing results that demonstrate errored seconds as a function of IDR spacing.

FIG. 7 is a graph illustrating empirical testing results that demonstrate errored seconds as a function of IDR spacing. In this example, segments had fixed durations, each beginning with an IDR (that is, a SAP corresponding to an IDR). With the advent of MPEG2 digital video in the 1990s, it was rapidly determined that video codecs were not particularly robust to errors. The longer the codec buffer lifetime of the corrupted or missing data, the more visible the disruption. It was determined relatively quickly that keeping corrupted data out of the codec buffers is vastly superior in subjective effect. That is, a freeze is generally better (in subjective observation) than the other artifacts. Within the first year or so the packet error rate (PER) requirement was reduced from 10-7 to about 1% PER Block Error Rate (BLER) for LTE is analogous to PER for MPEG2 transport. The improvement was accomplished by having the layers below the decoder discard all data from the point of corruption up to the next independent data refresh (IDR) frame for H.264, or new group of pictures (GOP) in MPEG2.

There were various methods of accomplishing this. For example, MPEG2 adopted a signaling bit that identified suspect packets. With the advent of multiple dedicated mobile multimedia physical layers there came to be a need for a universally applicable methodology for evaluating mobile video system performance in the presence of errors.

The scheme that was adopted is based on a long existing metric from data communications, an errored second. An "errored second" is generally any whole second that contains an error. This methodology was adapted to be the percentage of media seconds lost due to errors. There are implementations of the method that require a certain number of correct packets received ahead of declaring recovery. This methodology eliminates the need to understand upper layer syntax to make the measurement, but is an approximation. An example metric is 5% Erroneous Time or $ESR_5$.

As discussed above, DASH multimedia content includes a plurality of segments. In the analysis of FIG. 7, segment duration was set equal to IDR spacing (in terms of presentation time). The graph in FIG. 7 represents the impact of IDR spacing (and thus, segment duration) on erroneous time for TU-6 3 km/hr at 750 MHz for traces with an average BLER close to 1%. Results were generated by evaluating trace SNR on 1 msec intervals for 11, 51 second traces in 6 km(3), 2 km(5), and 1 km (3) cell radii. The phy burst spacing is 250 ms and data burst duration is 41 msec. This approximates MCS 18 at 800 kbps for 5 MHz, 95% coverage, 6 km cell, 750 MHz. Any segment with an error is counted as erroneous time (e.g., an errored second). An average of less than 5% errored time is met for 0.250 ms segments.

Figure 8:
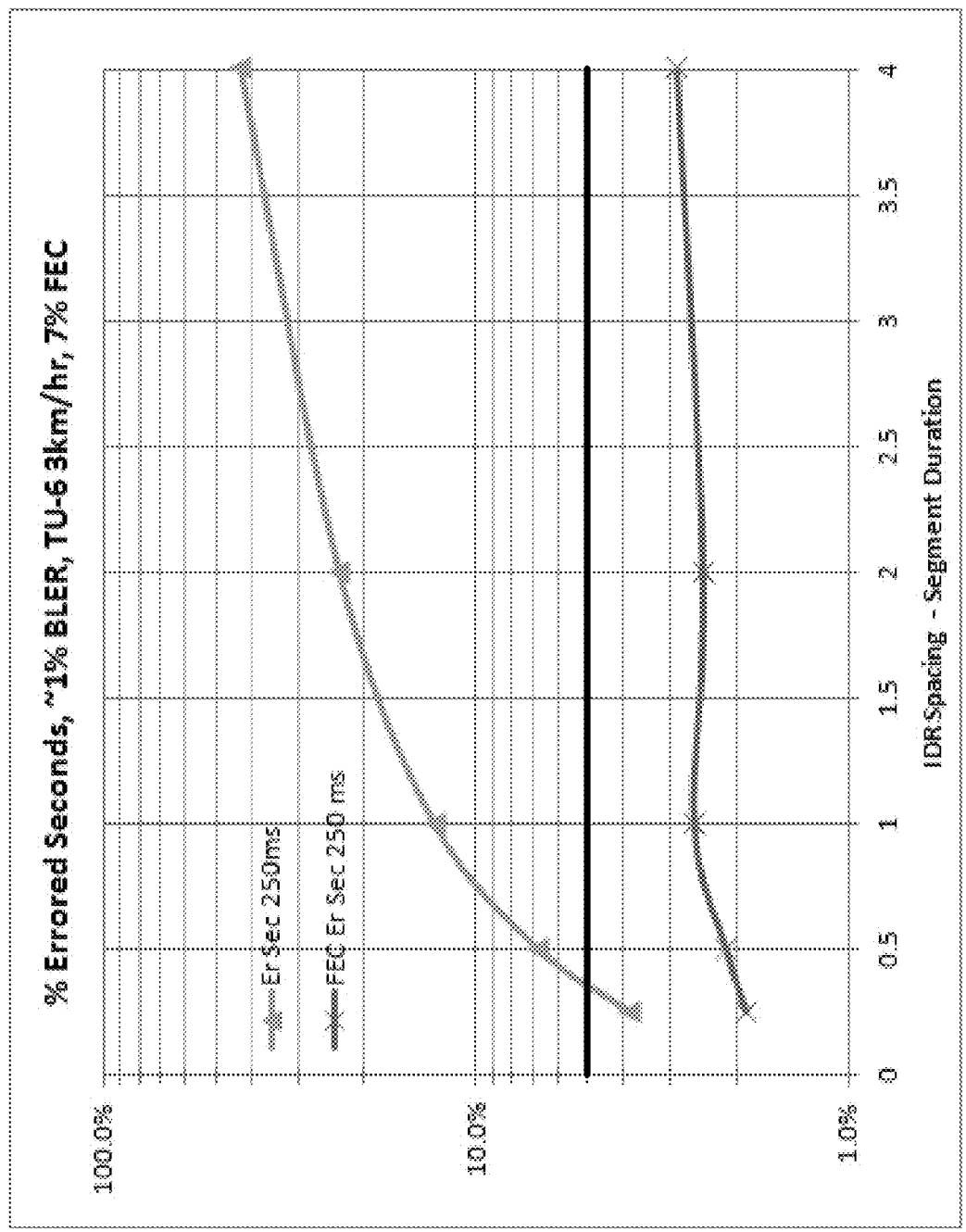
FIG. 8 is a graph illustrating another example of empirical testing results as a result of forward error correction (FEC).

FIG. 8 is a graph illustrating another example of empirical testing results as a result of forward error correction (FEC). There are various approaches for handling variation in erroneous time, e.g., with respect to the discussion of FIG. 7 above. In one example, a link budget can be modified according to segment duration. This may case a ~0.4 dB variation in required C/N for a range of 0.25 to 4 seconds IDR rate/segment duration.

As another example, an application layer FEC can be applied. This may case a relatively negligible (wash) result in link budget for 4 seconds. Thus, the C/N gain may approximately offset capacity loss. The erroneous time, as demonstrated in the example graph of FIG. 8, is approximately constant for ~7% FEC rate. The traces have Doppler applied (2 Hz), but no de-correlation due to motion.

Figure 9:
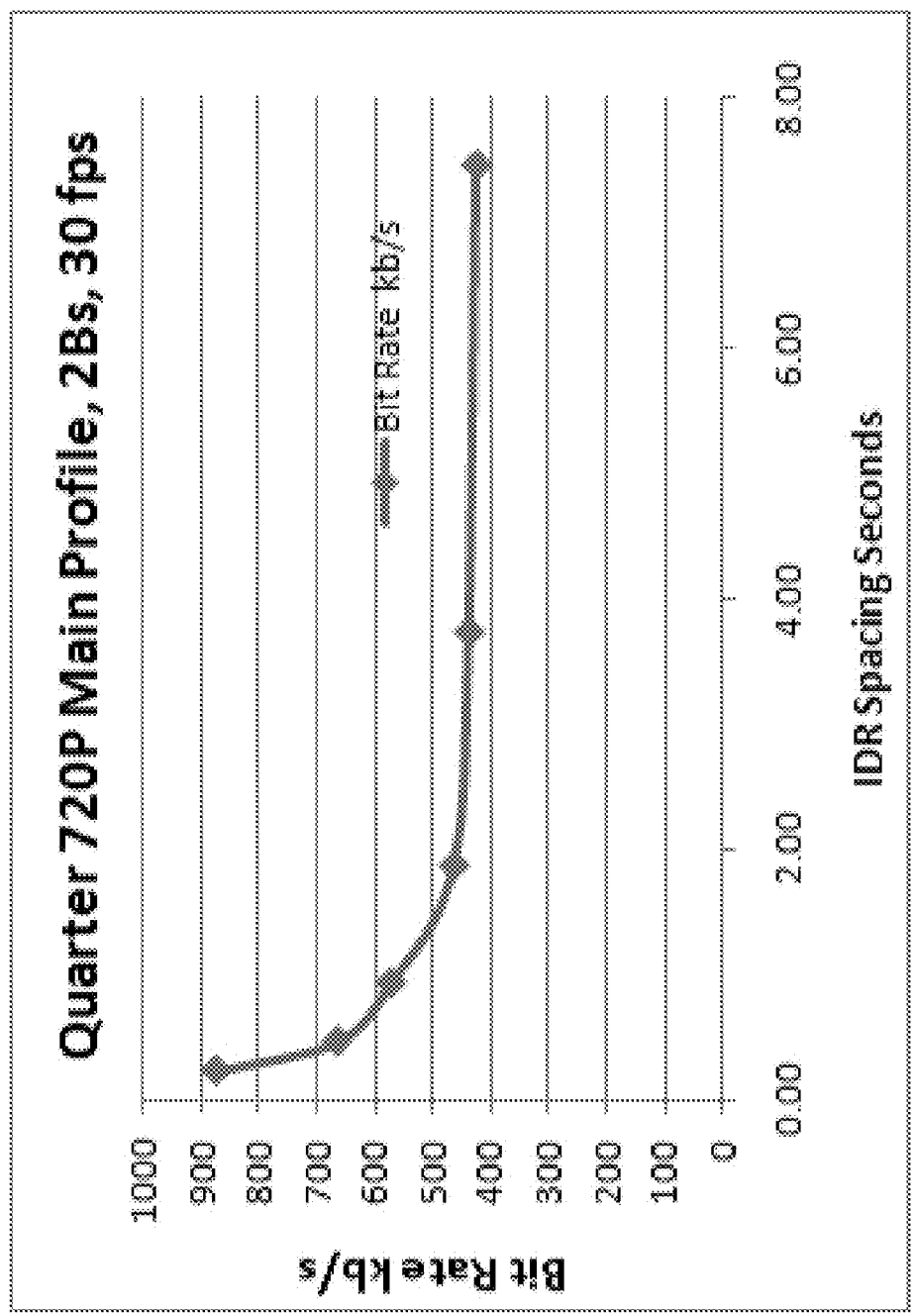
FIG. 9 is a graph illustrating empirical testing results demonstrating bit rates for segments at various IDR spacings (in presentation time).

FIG. 9 is a graph illustrating empirical testing results demonstrating bit rates for segments at various IDR spacings (in presentation time). The results depicted in FIG. 9 are based on an average of 35 dB peak signal to noise ratio (PSNR) video across a number of typical content types (e.g., sports, talking heads, movies, and the like). As shown in this example, frequent IDRs typically increase the corresponding bit rate. High motion sequences may, accordingly, require significantly higher bit rates.

Figure 10:
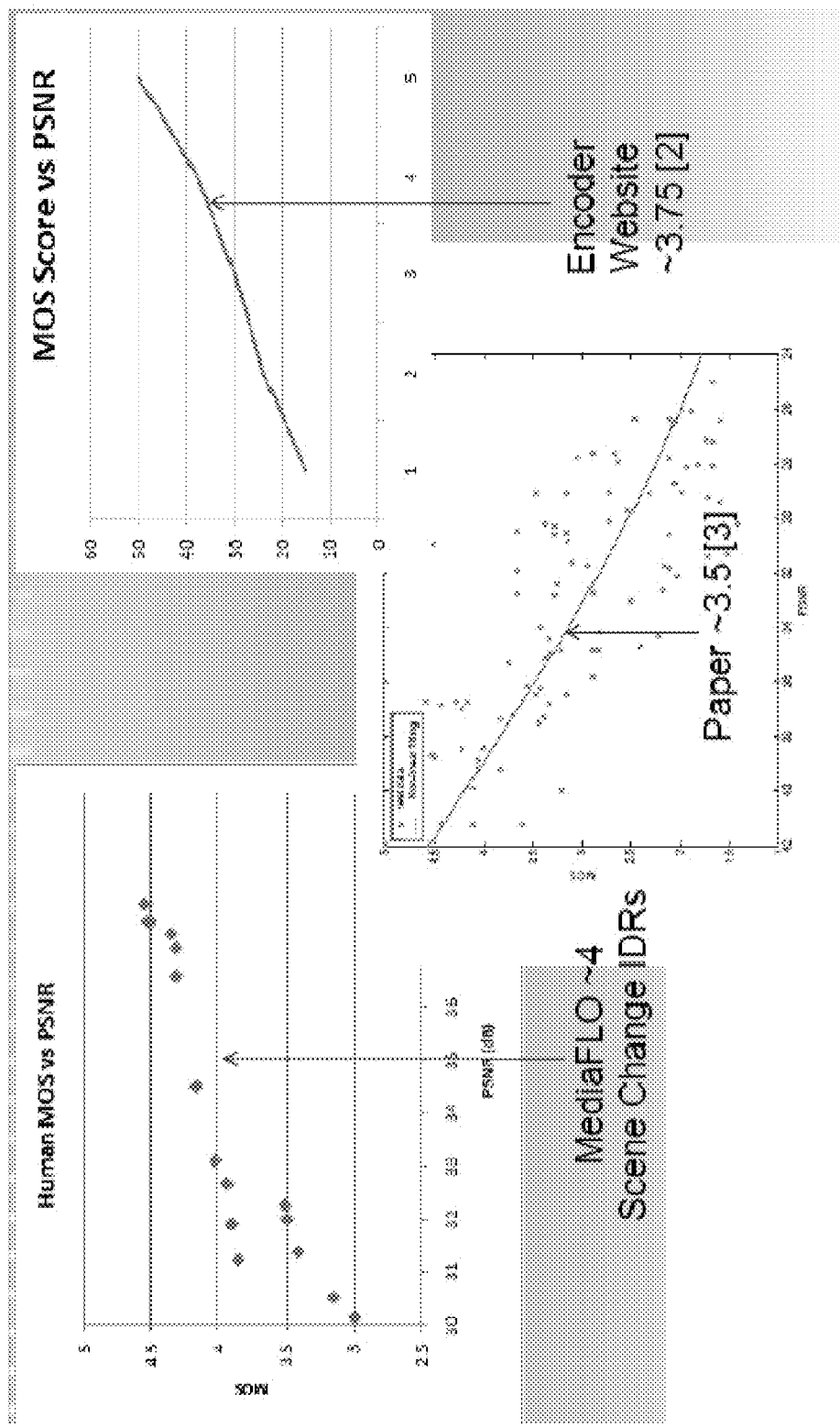
FIG. 10 illustrates a set of graphs depicting various peak signal to noise ratios (PSNR) relative to mean opinion scores (MOS).

FIG. 10 illustrates a set of graphs depicting various peak signal to noise ratios (PSNR) relative to mean opinion scores (MOS). As shown in these graphs, content selection and IDR placement method can significantly impact MOS relative to PSNR.

Figure 11:
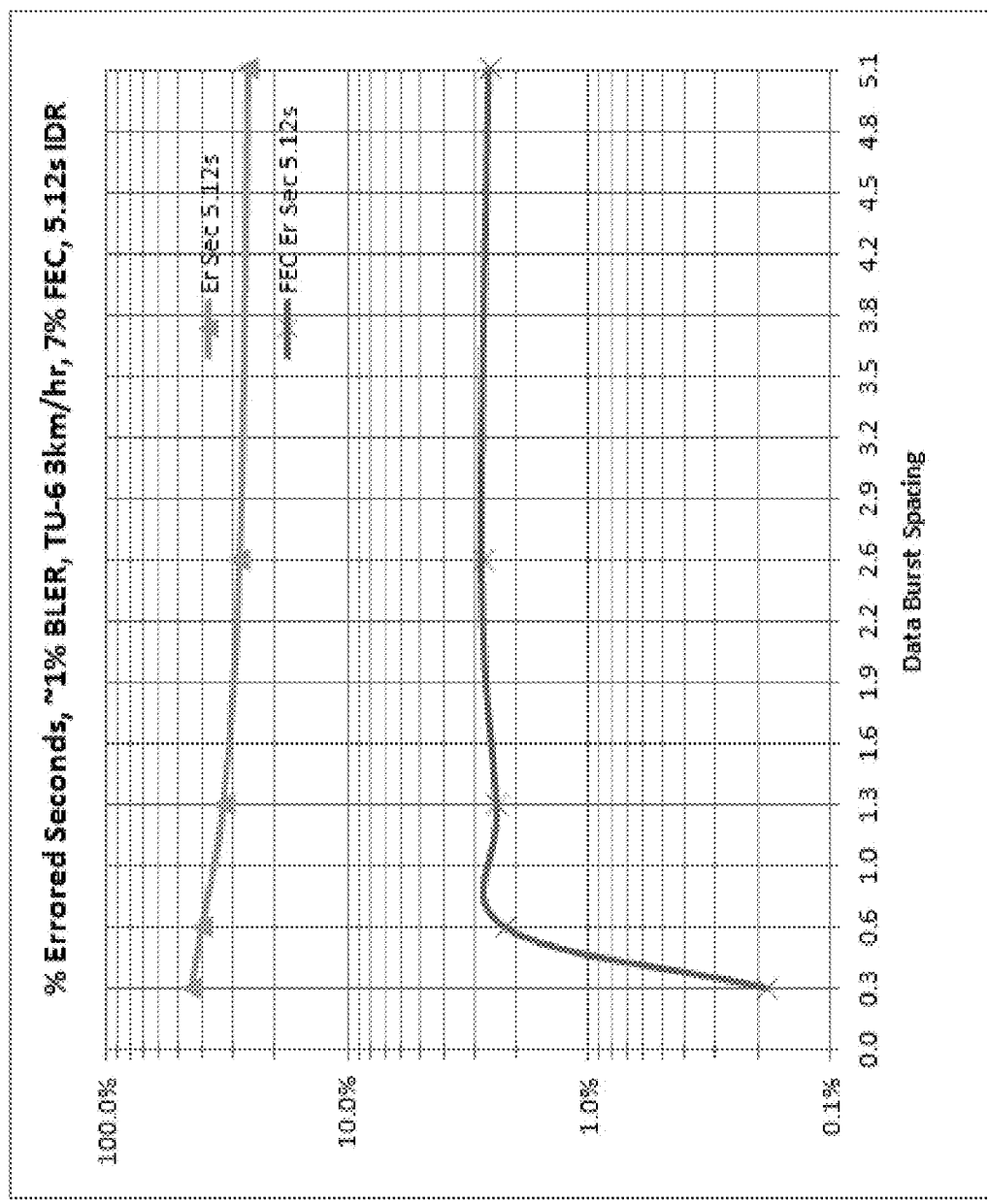
FIG. 11 is a graph depicting empirical testing results that demonstrate errored seconds for various data burst spacings, both with and without FEC.

FIG. 11 is a graph depicting empirical testing results that demonstrate errored seconds for various data burst spacings, both with and without FEC. As shown in the graph of FIG. 11, frequency of data bursts at the phy may impact both latency and time diversity. Network buffer time (distance between bursts) may add linearly to the end to end latency. Increasing inter burst spacing beyond 0.5 seconds may erode time diversity. In FIG. 11, the IDR spacing and segment duration are set to a constant 5.12 seconds. Burst spacing is evaluated at discrete values 0.32, 0.640, 1.28, 2.56, 5.12 sec, in this example. In this example, an FEC rate of 5% is sufficient with a 0.32 sec burst period, otherwise a 7% rate may be used.

The average time required to transmit 800 kbps is independent of the rate at which the data is burst at the phy Burst duration is inversely proportional to burst rate. The power consumption of the physical layer varies as a function of burst duration. There is about a 10 msec warm up time associated with each burst. For a 50 msec burst (MCS18, 800 kbps, 320 ms burst spacing) the radio is on for about 60 msec, causing a 20% increase in power consumption due to the phy. The radio is however only consuming ~10% of the total device consumption, when video is being watched. The backlight dominates the device power consumption. There is potentially a ~2% device consumption increase for 0.320 second vs. 5.12 seconds data burst spacing. These estimates are based on MediaFLO and are subject to revision.

Figure 12:
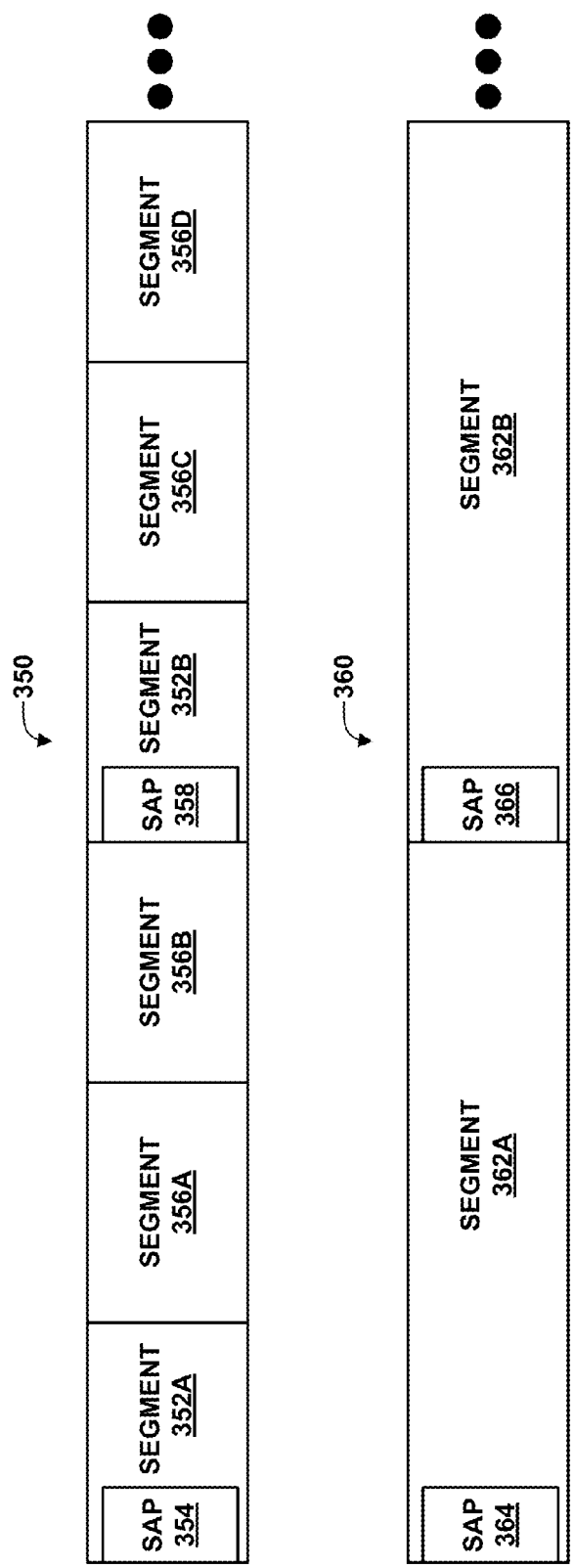
FIG. 12 is a conceptual diagram illustrating various examples of IDR spacing for various segment durations.

FIG. 12 is a conceptual diagram illustrating various examples of IDR spacing for various segment durations. As shown in FIG. 12, segment duration and IDR spacing (that is, SAP spacing) do not necessarily have to be equal. The example of FIG. 12 illustrates two example representations, e.g., representations corresponding to different profiles of DASH. Representation 350 corresponds to an example representation in accordance with certain examples of the techniques of this disclosure, in which some segments do not include a SAP, e.g., an IDR picture, a CRA picture, or other random access point. That is, representation 350 includes segments 352A, 352B (segments 352) that include SAPs 354, 358, respectively. Likewise, representation 350 includes segments 356A-356D (segments 356) that do not include SAPs. Representation 360, on the other hand, corresponds to an example of a conventional representation in DASH, in which all segments include SAPs. That is, representation 360 includes segments 362A, 362B (segments 362) that include SAPs 364, 366, respectively.

In general, the horizontal axis of representations 350, 360 corresponds to presentation time, that is, temporal playback time. Accordingly, the playback time between SAPs in representations 350 and 360 is approximately equal. That is, the presentation time difference between SAP 354 and SAP 358 in representation 350 is approximately equal to the presentation time difference between SAP 364 and SAP 366 in representation 360. However, segments 352, 356 of representation 350 represent relatively shorter durations of presentation time than segments 362 of representation 360. In this manner, content preparation device 20 may construct and send segment 352A of representation 350 faster than segment 362A of representation 360.

In this manner, representation 350 represents an example of a representation including a first segment (e.g., segment 352A) that comprises media data comprising a first stream access point (e.g., SAP 354) and a second segment (e.g., segment 356A, 356B) that comprises media data that lacks a stream access point. Furthermore, media data of segment 356A and/or 356B may be coded relative to media data of segment 352A, e.g., SAP 354. For example, a video encoder or a video decoder may use SAP 354, or one or more other pictures of segment 352A, as a reference picture when coding one or more pictures of segment 356A and/or segment 356B. Accordingly, at least a portion of media data of segments 356A, 356B may be coded relative to at least a portion of media data of segment 352A.

The FLUTE stack, executed by a client device such as client device 40 (FIG. 1), may pass up complete files. Each file (segment) may or may not contain an IDR, in accordance with examples of this disclosure. If segment duration and IDR spacing are the same (e.g., in representation 350 as in representation 360), it may maximize time diversity for application FEC, but may also add linearly to latency. On the other hand, if segments are much shorter than IDR spacing, then time diversity for FEC may be reduced, but so is latency. IDR spacing may linearly impact channel change time independent of segment duration.

Adding a relatively small amount of application FEC (~7%) may make the system $ESR_5$ performance vs. segment duration essentially constant. The impact of an application layer outer code on the link budget is relatively minor. Early on in MediaFLO, there was active consideration of running streaming media with no outer code, after field tests this idea was dropped due to visually superior performance with the outer FEC applied. Maintaining an option for application layer FEC for streaming media may be useful. While close IDR spacing may be useful for rapid channel change, it does not directly impact latency. Thus, segments may be made shorter than IDR spacing. Physical layer data burst spacing has direct impact on latency and time diversity, so if the system behavior per content type is to be the same for all locations in the network, this may be specified accordingly. MSP/CSA settings may be specified by BVPS. Bit rates in these examples reflect decent (3.5-4.0) video quality on average content. High motion video, e.g., for sports, may utilize higher bit rates.

Figure 13:
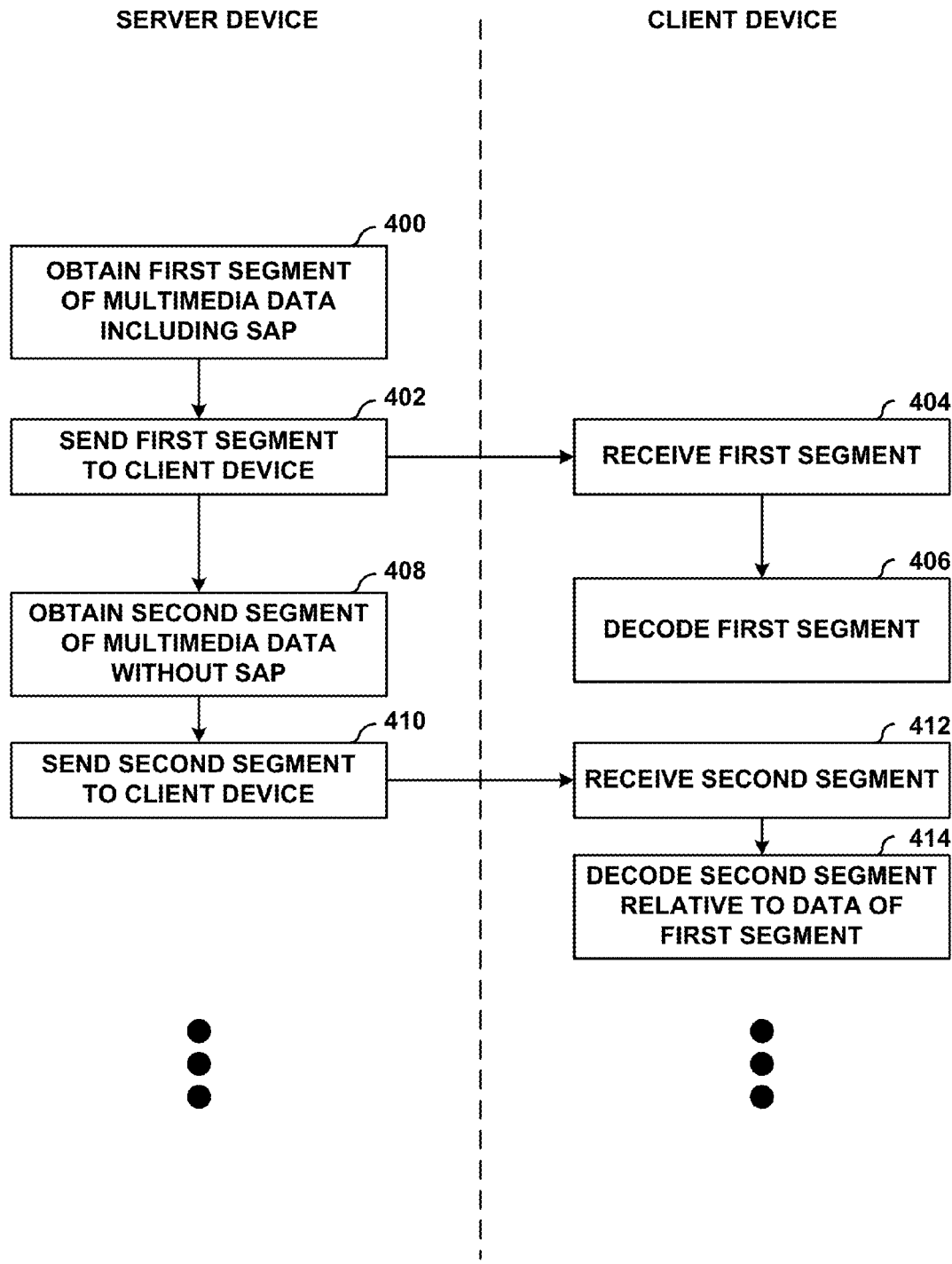
FIG. 13 is a flowchart illustrating an example method for sending one or more segments of a representation that do not include stream access points (SAPs).

FIG. 13 is a flowchart illustrating an example method for sending one or more segments of a representation that do not include stream access points (SAPs). Initially, a server device, such as server device 60, may obtain a first segment of multimedia data, where the first segment includes a SAP (400). In some examples, server device 60 may receive the first segment of the multimedia data from content preparation device 20 (FIG. 1). Alternatively, server device 60 may be configured to perform the functionality attributed to content preparation device 20, in which case server device 60 may encode video data of the first segment. In any case, in this example, the first segment may include a SAP.

The method of FIG. 13 may be performed during a live broadcast of streaming data. Accordingly, as soon as server device 60 has obtained the first segment, server device 60 may send the first segment to client device 40 (402). Server device 60 may also obtain (e.g., receive or encode data for) a second segment of the multimedia data, where the second segment lacks a SAP (408). Thus, server device 60 may send the first segment to client device 60 before obtaining a second, subsequent segment of the multimedia data. After obtaining the second segment, server device 60 may send the second segment to client device 40 (410).

After client device 40 receives the first segment (404), client device 40 may decode the first segment (406). In addition, client device 40 may display decoded pictures of the first segment after the pictures have been decoded. Moreover, client device 40 may receive the second segment (412), e.g., after decoding at least a portion of the first segment. In particular, client device 40 may receive and decode the second segment before receiving a subsequent stream access point. In this manner, client device 40 may, before a second stream access point, subsequent to the first stream access point, is available, decode at least a portion of coded video data of the first segment prior to receiving the second segment. After receiving the second segment, client device 40 may decode at least a portion of the second segment relative to data of the first segment (414), before a subsequent stream access point is available. For example, at least one frame of the second segment may be inter-prediction coded relative to one or more frames of the first segment. Client device 40 may decode this frame of the second segment relative to the one or more frames of the first segment.

In this manner, the method of FIG. 13 represents an example of a method including receiving a first segment of media data, wherein the media data of the first segment comprises a first stream access point, receiving a second segment of media data, wherein the media data of the second segment lacks a stream access point at the beginning of the second segment, and before a second stream access point, subsequent to the first stream access point, is available, decoding at least a portion of the media data of the second segment relative to at least a portion of the media data of the first segment. In particular, in this example, the second segment lacks a stream access point, that is, does not include any stream access point.

Moreover, the method of FIG. 13 also represents an example of a method including obtaining a first segment of media data, wherein the media data of the first segment comprises a first stream access point, sending the first segment to a client device, obtaining a second segment of media data, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, sending the second segment to the client device.

Figure 14:
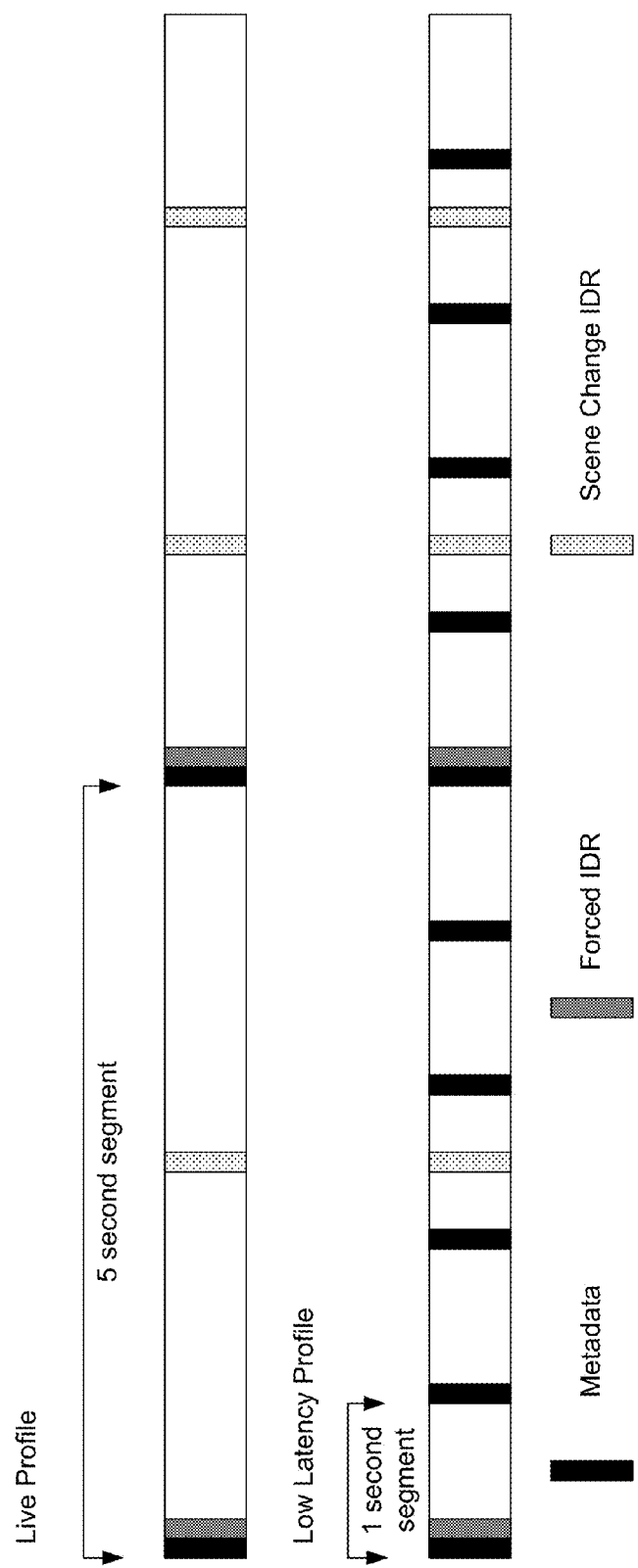
FIG. 14 is a conceptual diagram illustrating examples of data arrangements for DASH Live and Low Latency Live profiles.

FIG. 14 is a conceptual diagram illustrating examples of data arrangements for DASH Live and Low Latency Live profiles. In this example, the Live profile includes five-second segments as an example, including metadata (represented by black-shaded portions), forced IDR pictures (represented by darkly shaded portions), and zero or more scene change IDR pictures (represented by lightly shaded portions). That is, each segment includes data that, when decoded and played back at an expected frame rate, is sufficient to correspond to five seconds worth of playback time. For example, if an advertised framerate is 60 frames per second, each segment of the Live profile may include data for 300 frames. In the specific example of FIG. 14, the Live profile includes a first segment including one scene change IDR picture and a second segment including two scene change IDR pictures. Each segment in the Live profile also begins with a forced IDR picture. For example, a corresponding video coding standard may dictate that an IDR picture must occur every five seconds worth of playback time.

FIG. 14 also illustrates an example set of data for a Low Latency Live profile of DASH. In this example, each segment of the Low Latency Live profile represents one segment worth of playback. For example, if an advertised framerate is 60 frames per second, each segment may include data for 60 frames. In accordance with the techniques of this disclosure, pictures of segments of the Low Latency Live profile need not each begin with an IDR picture. Instead, pictures of segments of the Low Latency Live profile may be coded relative to an IDR picture of a previous segment. That is, pictures of a segment that does not include an IDR picture at a beginning of the segment may be coded either relative to the IDR picture, a picture coded based on the IDR picture, or independently (e.g., as an I-frame). Metadata of each segment may include segment header information. Because each segment need not include an IDR picture, the data of the Low Latency Live profile may reduce latency, relative to the Live profile, because segments of the Low Latency Live profile can be sent before a corresponding segment of the Live profile.

In one example, a client device (such as client device 40 of FIG. 1) configured to utilize a DASH Live profile may buffer more video data per segment than when the client device is configured to utilize a DASH Low Latency Live profile. For example, as illustrated in FIG. 14, the DASH Live profile may cause the client device to buffer five seconds of video data per segment, whereas the DASH Low Latency Live profile may cause the client device to buffer one second of video data per segment. As noted above, a particular amount of time buffered corresponds to an amount of playback time. In this manner, the DASH Low Latency Live profile may divide the same stream into more segments. That is, as shown in FIG. 14, the Live profile and Low Latency Live profile may correspond to different representations of the same media content. Further, a DASH Live profile may require an SAP or IDR picture at the beginning of each segment, whereas a DASH Low Latency Live profile may omit such a requirement, in accordance with the techniques of this disclosure. That is, a representation formed according to the DASH Low Latency Live profile may lack an IDR picture at the beginning of one or more segments, as shown in FIG. 14.

Figure 15:
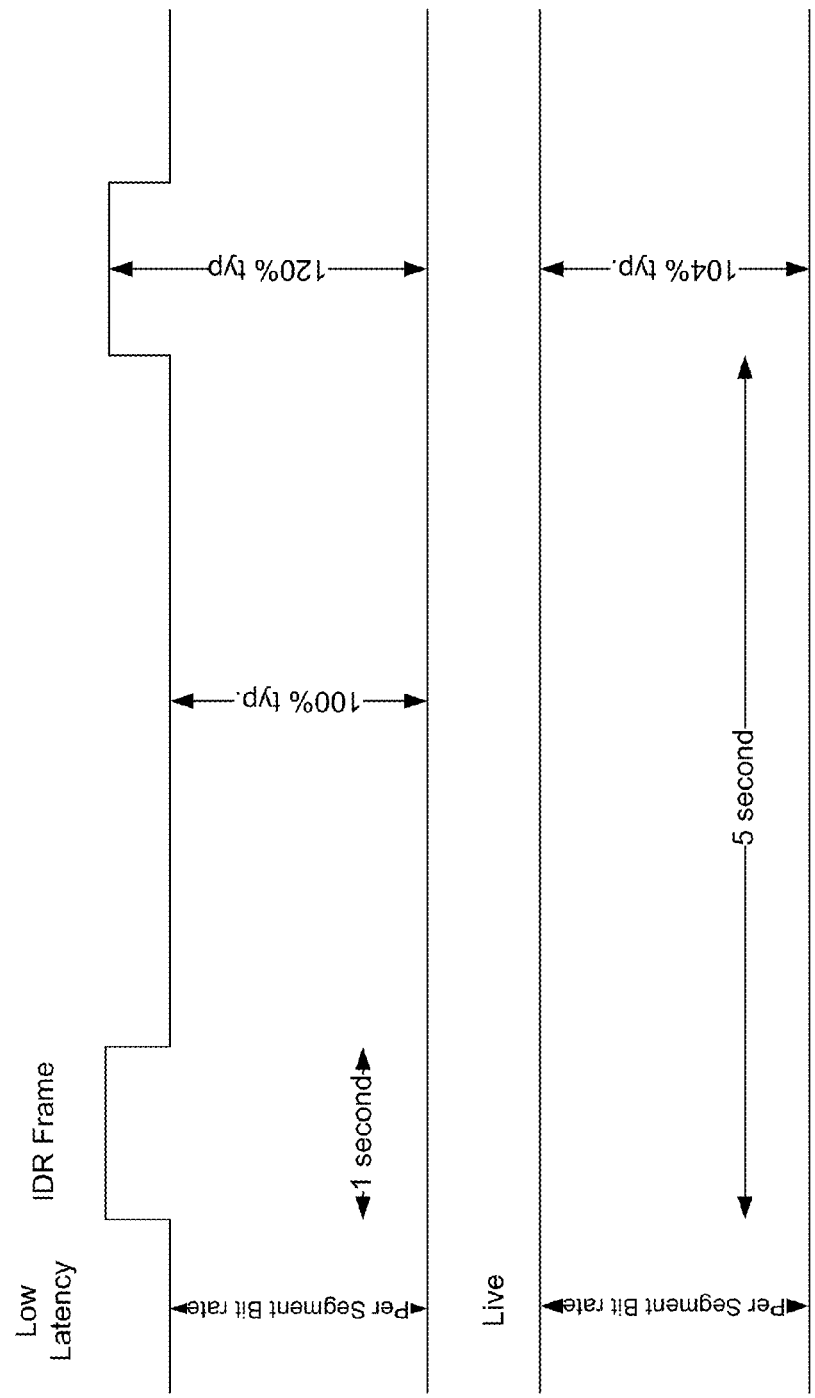
FIG. 15 is a conceptual diagram illustrating per-segment bit rates for exemplary DASH Live and DASH Low Latency Live profiles at the physical layer.

FIG. 15 is a conceptual diagram illustrating per-segment bit rates for exemplary DASH Live and DASH Low Latency Live profiles at the physical layer. A DASH Low Latency Live profile may reduce latency, but may also increase the variation of the segment-to-segment data size. For example, as shown in FIG. 15, the DASH Low Latency Live profile segments may have a greater size than the DASH Live profile segment, because there may be less rate smoothing across each segment. In FIG. 15, for purposes of example, IDR and other frames are assumed to be fixed in size, and the proportions are based on averages for a variety of content types.

Figure 16:
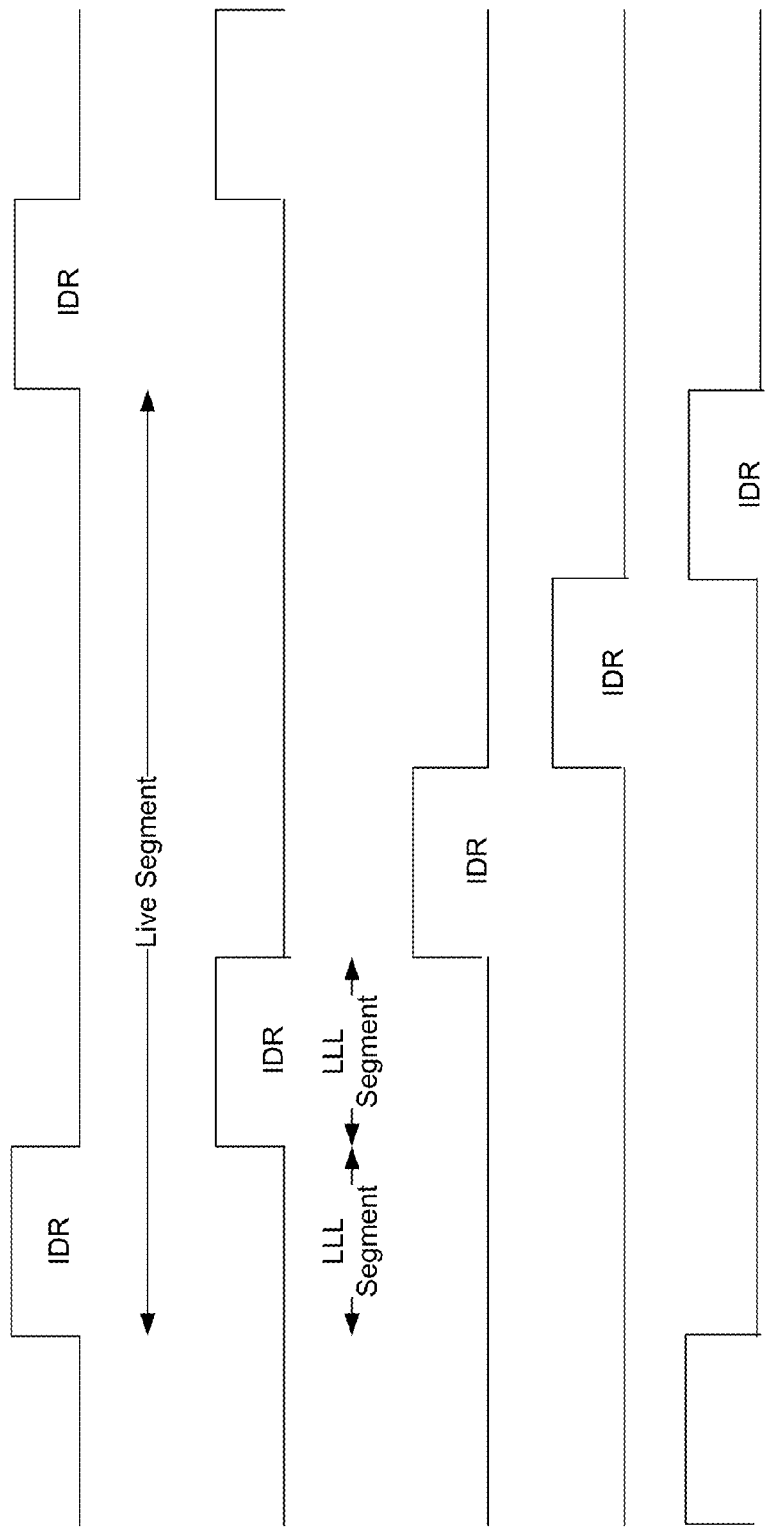
FIG. 16 is a conceptual diagram illustrating a technique for minimizing the peak-to-peak bit-rate variations of Low Latency Live segments.

FIG. 16 is a conceptual diagram illustrating a technique for minimizing the peak-to-peak bit-rate variations of Low Latency Live segments. In one example, multiple services may be multiplexed together. The aggregate bit-rate variation may be minimized for DASH Low Latency Live profiles by staggering the phase of forced IDR pictures relative to the DASH Low Latency Live profile segment locations. For example, as shown in FIG. 16, one forced IDR picture is inserted per DASH Low Latency Live profile segment in a staggered fashion. If a service has N streams in an ensemble, N phases of forced IDR pictures may be inserted in round-robin fashion based on an integer relationship among the DASH Live profile segment duration and the DASH Low Latency Live profile segment. In other words, in FIG. 16, five forced IDR pictures may be inserted in round-robin fashion, because the DASH Live profile segment is five times the length of the DASH Low Latency Live profile segments. In one configuration, if there are a large number of services such that the DASH Live profile segment becomes too long, the N services may be divided into multiple IDR pictures round-robin groups. Further, the round robin of the forced IDR pictures need not be exactly N; the forced IDR picture spacing may be greater than N.

In this manner, a source device, such as content preparation device 20 or server device 60, may be configured to form an ensemble of services, each of the services comprising a respective plurality of segments, wherein one of the services comprises a plurality of segments comprising the first and second segments, wherein forming the ensemble of services comprises, form one of the services to comprise a Dynamic Adaptive Streaming over HTTP (DASH) Live profile service, wherein a first SAP of a first segment of the DASH Live profile service has a first presentation time, wherein a second SAP of a second segment of the DASH Live profile has a second presentation time, and wherein the first segment and the second segment are consecutive within the DASH Live profile service, and form one or more of the services to comprise respective DASH Low Latency Live profile services such that, for presentation times between the first presentation time and the second presentation time, the DASH Low Latency Live profile services include SAPs having presentation times that are between the first presentation time and the second presentation time, different from the first presentation time, and different from presentation times of other SAPs of other services of the DASH Low Latency Live profile services.

The source device may further, when segments of the DASH Low Latency Live profile services including the SAPs having the presentation times that are between the first presentation time and the second presentation time do not include scene change instantaneous decoder refresh (IDR) pictures, form DASH Live profile service such that the first segment has a length that is a multiple of lengths of the segments of the DASH Low Latency Live profile services. Moreover, the source device may determine whether the ensemble of services includes a number of services that exceeds a threshold number of services, and when the number of services exceeds the threshold number of services, split the ensemble into two or more separate ensembles of services.

Segments of the DASH Low Latency Live profile services may have a first length, and the source device may construct the first segment of the DASH Live profile service to have a length equal to the number of DASH Low Latency Live profile services times the firth length, plus the first length. That is, if the first length is K and the number of services is N, the length of the first segment of the DASH Live profile service may have a length of K*N+K, or (N+1)*K. Alternatively, the length of the first segment of the DASH Live profile service may be (N+J)*K, where J is a positive integer.

If the ensemble of services is merely a first subset of a full ensemble, and the full ensemble is relatively large, a second subset of the full ensemble may include SAPs at presentation times corresponding to the presentation times of the SAPs of the first subset. In this manner, wherein the ensemble of services comprises a first subset of a full ensemble of services, and wherein a second subset of the full ensemble of services includes DASH Low Latency Live profile services including SAPs at presentation times of at least some of the presentation times of the DASH Low Latency Live profile services of the first subset. That is, the source device may increase the number of SAPs per service ensemble per segment for large ensembles of services.

Figure 17:
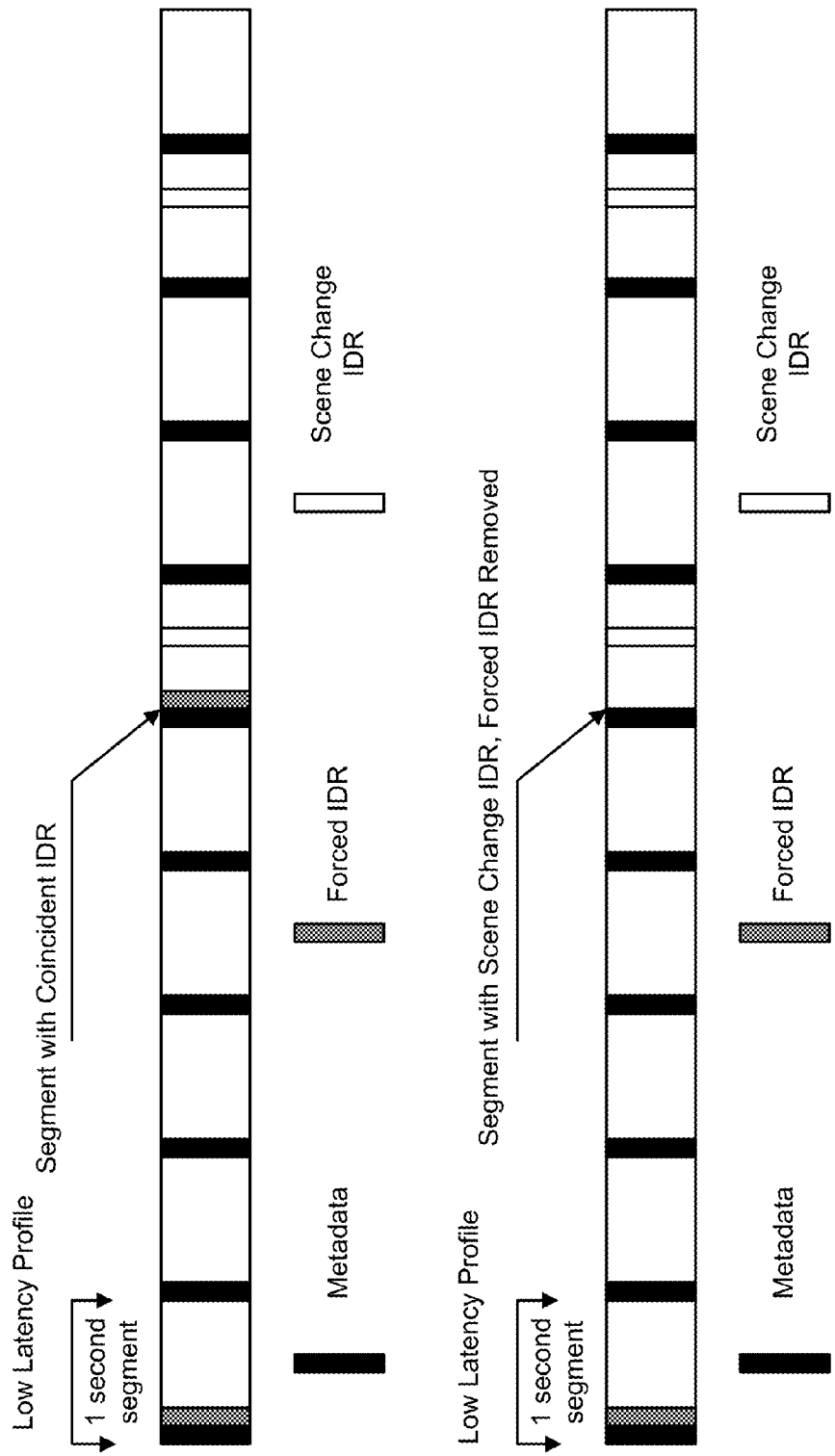
FIG. 17 is a conceptual diagram illustrating example representations corresponding to DASH Live and DASH Low Latency Live profiles, in which a scene change IDR frame is coincident with a forced IDR frame.

FIG. 17 is a conceptual diagram illustrating example representations corresponding to DASH Live and DASH Low Latency Live profiles, in which a scene change IDR frame is coincident with a forced IDR frame. In a DASH Low Latency Live profile, it may be possible that a forced IDR frame (representing an example of a SAP) is coincident with a scene change IDR frame (i.e., the forced IDR frame and the scene change IDR frame are within the same segment). A source device, such as content preparation device 20 or server device 60 (FIG. 1) may determine that a segment occurs at a time (measured in playback time) at which a relevant coding standard dictates that an IDR picture is required. However, the source device may further determine that the segment would include an IDR picture, such as a scene change IDR picture.

Thus, rather than including both a forced IDR picture and a scene change IDR picture in the segment, the source device may simply include the scene change IDR picture, which may both satisfy the requirements of the relevant standard and improve a rate-distortion metric for the segment. Data for pictures occurring before the scene change IDR picture of the segment (in decoding order) may be coded relative to data of previous segments. The source device may further provide information for accessing the scene change IDR picture as a random access point, such as a byte offset to the scene change IDR picture. In this manner, a client device, such as client device 40, may use this data to initiate a stream from the scene change IDR picture, rather than from the beginning of the segment.

A scene change IDR may not be able to be relocated in a DASH Low Latency Live profile. In one example, the forced IDR frame may be dropped in this segment without causing a change in the required capabilities for a DASH Low Latency Live profile (i.e., the function of the dropped forced IDR frame may be provided by the scene change IDR frame). DASH Low Latency Live profiles may support segments that do not start with an IDR frame or a SAP. DASH Live profiles, on the other hand, may retain the forced IDR frame. This behavior may make the DASH Low Latency Live profile different than a DASH Live profile, but this may not cause problems for dedicated in-venue applications, because the encoding is dedicated to a single facility. Video pictures with references to video pictures in a future segment, however, may need to be avoided, or there may be an increase in the latency.

Figure 18:
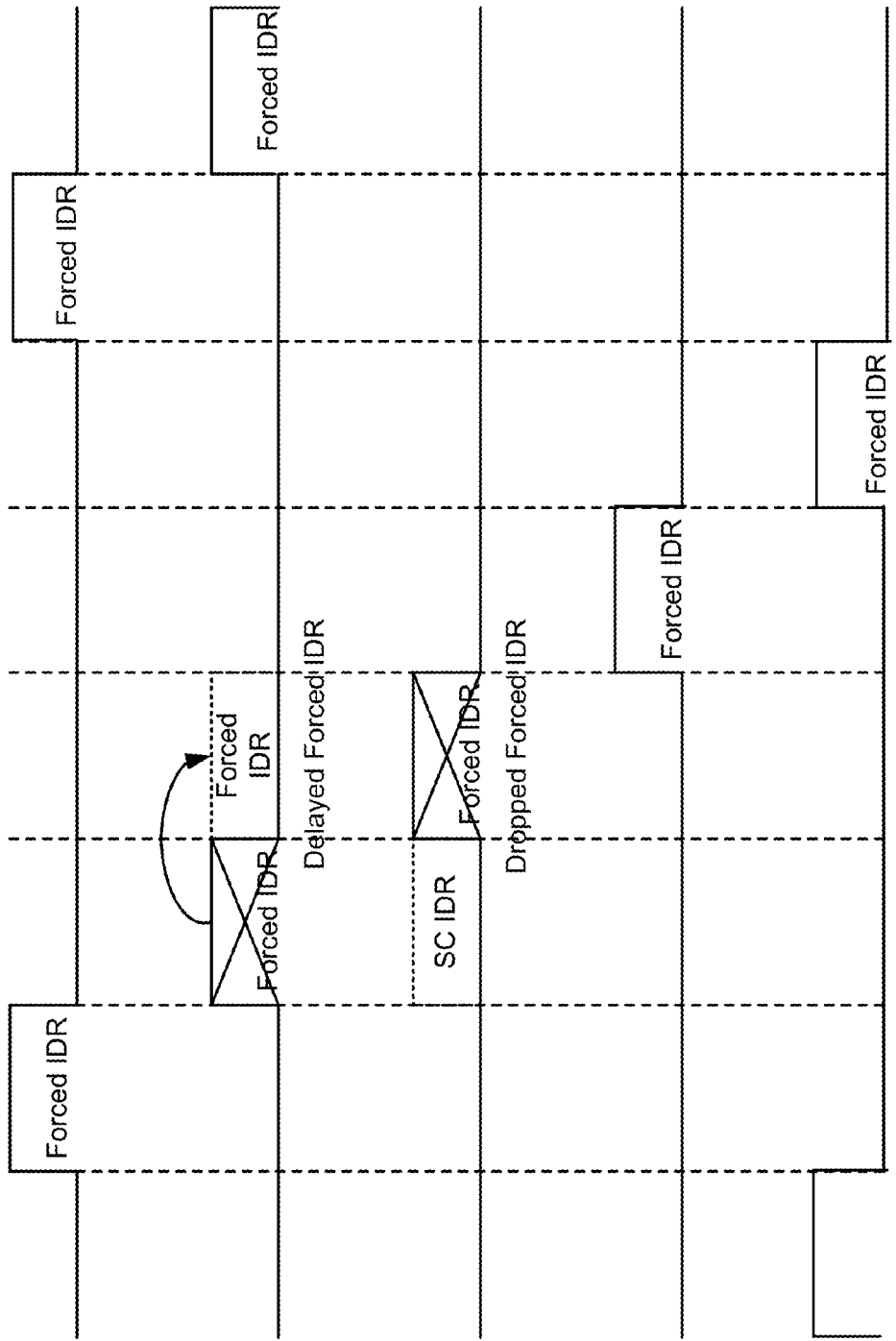
FIG. 18 is a conceptual diagram illustrating a technique for minimizing the peak-to-peak bit-rate variation in the presence of a non-coincident scene change IDR frame.

FIG. 18 is a conceptual diagram illustrating a technique for minimizing the peak-to-peak bit-rate variation in the presence of a non-coincident scene change IDR frame. As an example, a scene change IDR picture may potentially coincide with the round-robin assignment for another stream's forced IDR frame. In one example, the forced IDR picture may be delayed for one segment to prevent the occurrence of two IDR pictures on different streams in the same DASH Low Latency Live profile segment. This technique may not be compatible with basic concurrent generation of the DASH Live profile and the DASH Low Latency Live profile from the same encoder. In another example, if there are two or more scene change IDR pictures across the services in a round-robin group, then only one forced IDR picture may be dropped or delayed. As discussed previously, a forced IDR picture may be dropped if a scene change IDR picture is in the same service, or may be delayed if a scene change IDR picture is in the same segment of another service.

In this manner, a source device, such as content preparation device 20 or server device 60, may be configured to form a plurality of segments for a plurality of different representations such that when a segment of one of the plurality of different representations includes a stream access point, temporally co-located segments of the other representations of the plurality of different representations lack stream access points.

Figure 19:
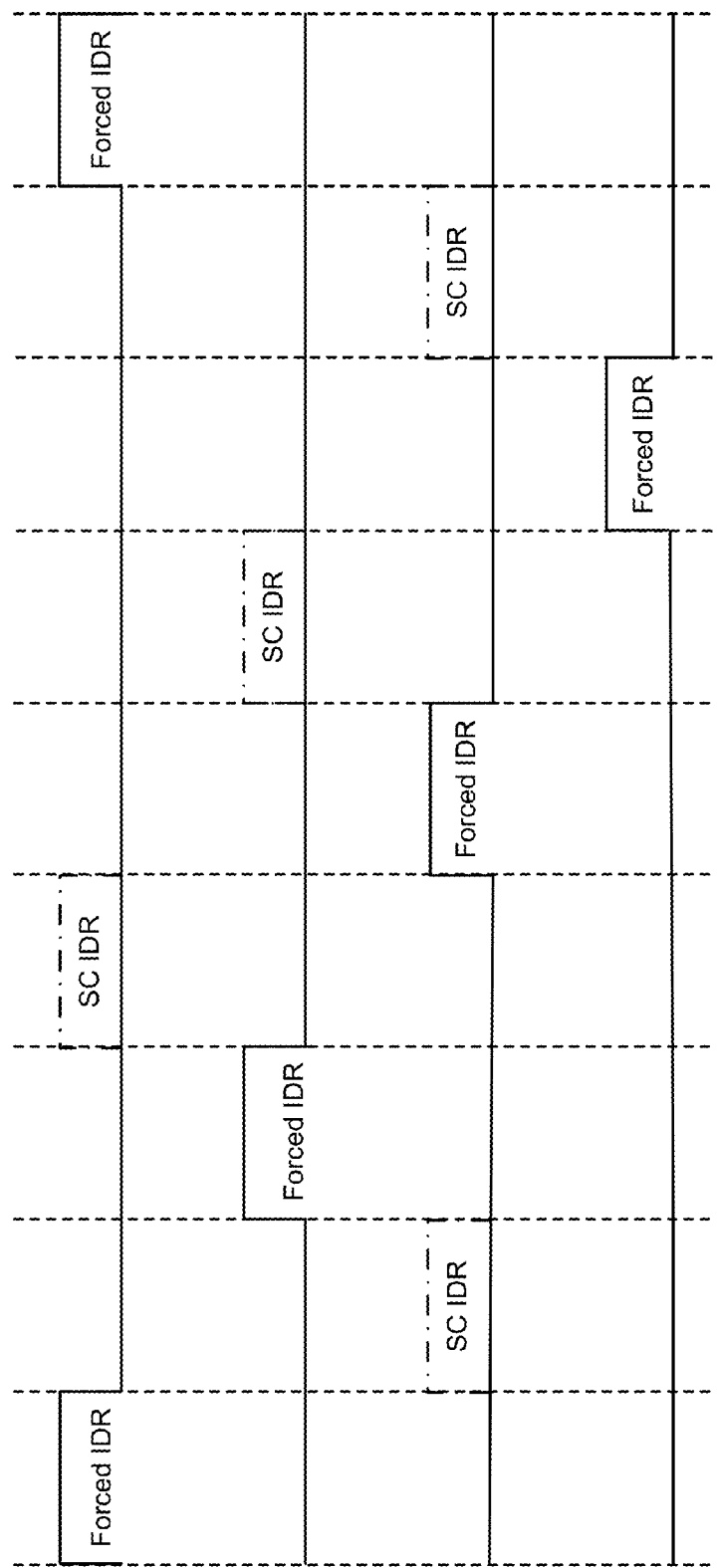
FIG. 19 is a conceptual diagram illustrating a near-optimum forced IDR picture sequence that allows for scene change IDR frames.

FIG. 19 is a conceptual diagram illustrating a near-optimum forced IDR picture sequence that allows for scene change IDR frames. Inserting forced IDR pictures in segments at a cadence that is greater than the number of services in the ensemble of DASH Low Latency Live profile services may allow increased flexibility in relocating IDR pictures. In one example, the probable total number of IDR pictures in a given service per segment may be given by the following equation:

$$\left(\frac{1}{C} + \frac{1}{S}\right) \times N$$

In the above equation, C is the insertion cadence of forced IDR pictures in segments, S is the mean time between scene change IDR pictures in segments, and N is the number of services in the ensemble. Because the basic mechanism for rate smoothing is to achieve one IDR picture per segment across the ensemble of services, increasing the number of segments per forced IDR picture to a cadence greater than the number of services may increase the probability that the one-IDR-frame-per-segment target may be met. This approach may have its limits, however, because the target is to achieve one IDR picture per segment ensemble, not less.

For example, as illustrated in FIG. 19, if there are four services and the mean time to a scene change IDR picture is seven segments, then the duration of the forced IDR picture cadence may optimally be eight segments in duration. In this example, there may be, nominally, one forced IDR picture across all services of the ensemble for every other segment. Using the techniques described above, forced IDR pictures may be shifted when coincident with a scene change IDR picture.

In the example shown in FIG. 19, no scene change IDR pictures occur in a forced IDR frame location, which may be arbitrary and unlikely. This arrangement, however, meets the goal of one IDR picture per segment for the ensemble. If the content of the services is highly correlated, scene changes may be highly correlated as well, and the method described may not be as effective. Further, for a large group of services, the goal may be adjusted to two or more IDR pictures per ensemble segment. This may be more effective than having multiple groups because the pool of services may be increased. Moreover, the cadence of forced IDR pictures may become very large when the number of services multiplied by the probability of a scene change IDR pictures per segment approaches one.

Figure 20:
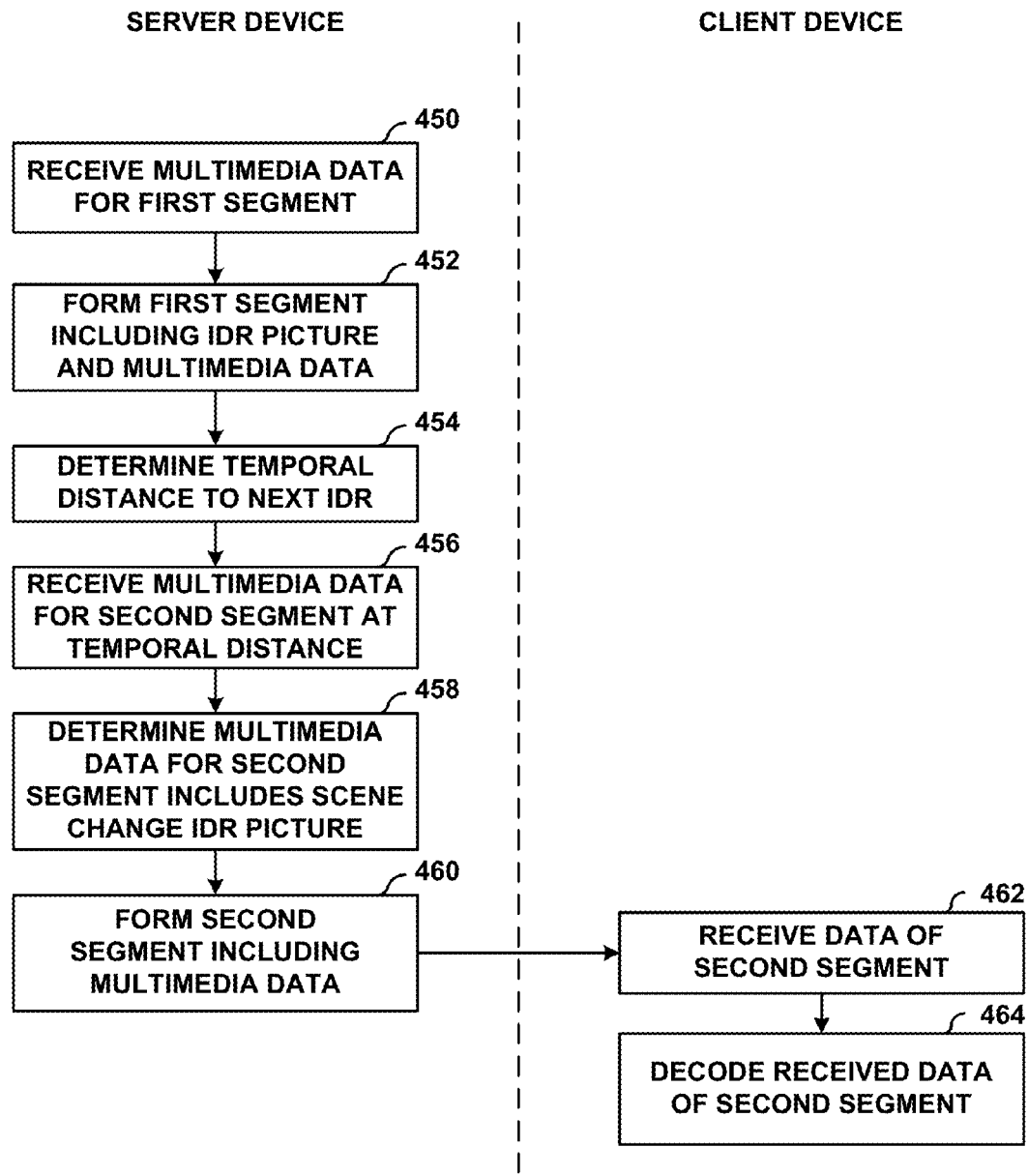
FIG. 20 is a flowchart illustrating another example method for forming a representation in accordance with certain techniques of this disclosure.

FIG. 20 is a flowchart illustrating another example method for forming a representation in accordance with certain techniques of this disclosure. In this example, a server device, such as content preparation device 20 or server device 60 (FIG. 1), forms a representation including at least one segment that includes a SAP at a position other than the beginning of the segment. In particular, in this example, the server device receives multimedia data for a first segment (450). The multimedia data may include an IDR picture at the beginning of the first segment in decoding order. Alternatively, the multimedia data may not include the IDR picture, but the server device may transcode a picture for the first segment as an IDR picture. The server device may, accordingly, create the first segment including an IDR picture at the beginning of the first segment (in decoding order), as well as the remaining multimedia data that was received (452).

The server device may then continue to code other segments (not shown in FIG. 20). While coding the other segments, the server device may track a temporal distance from the IDR picture of the first segment. Based on this tracking, the server device may determine when a temporal distance to a next IDR picture has elapsed, as indicated by a relevant coding standard (454). For example, the server device may track a number of pictures that have been included in the other segments, as well as a frame rate for playback of the multimedia data, and determine when the temporal distance has elapsed based on the frame rate and the number of pictures.

The server device may then receive multimedia data for a second segment at the temporal distance (456). It should be understood that one or more segments may separate the first segment from the second segment, and that the terms "first" and "second" are used nominally, rather than ordinally, in this description of FIG. 20. The server device may further determine that the multimedia data of the second segment includes a scene change IDR picture (458). Moreover, the server device may determine that the multimedia data does not include any other IDR picture, e.g., an IDR picture at the beginning of the multimedia data of the second segment.

Whereas conventionally, the second segment may include an IDR picture at the beginning of the second segment, the server device may, in accordance with the techniques of this disclosure, instead treat the scene change IDR picture as the IDR picture that satisfies the relevant coding standard. That is, the scene change IDR picture of the second segment may be used instead of an additional "forced IDR" picture. Accordingly, the server device may form the second segment including the multimedia data, such that the second segment lacks an IDR picture at the beginning of the second segment, despite the mandates of the relevant standard. Because the multimedia data of the second segment includes the scene change IDR picture, this scene change IDR picture may satisfy the mandate of the relevant standard of an IDR picture occurring with a particular temporal regularity.

Furthermore, a client device, such as client device 40 (FIG. 1) may retrieve data of the second segment (462). For example, the client device may begin network streaming at the scene change IDR picture. Thus, rather than beginning network streaming at the beginning of the second segment, the client device may begin network streaming at the scene change IDR picture instead. The server device may advertise a byte range offset to the beginning of the scene change IDR picture, e.g., in a manifest file corresponding to the first segment and the second segment. Thus, the client device may submit a partial GET request, specifying a byte range of the second segment that starts with the byte offset.

The client device may, but need not, retrieve data of the second segment that precedes the scene change IDR picture. However, when the client device begins streaming with the second segment, such data preceding the scene change IDR picture in the second segment (in decoding order) may not be decodable. The client device may decode the received data of the second segment, starting with the scene change IDR picture in decoding order (464). The client device may also rearrange an order of the pictures of the second segment following decoding, into a display order, and display the decoded pictures.

In this manner, the method of FIG. 20 represents an example of a method including receiving a segment of multimedia data, wherein media data of the segment of the multimedia data lacks a stream access point at the beginning of the second segment, and decoding at least a portion of the media data of the segment.

The method of FIG. 20 represents an example in which the client device performs random access starting with the second segment. However, in other examples, the client device may receive both the first segment and the second segment. In such examples, the method may include receiving a first segment of media data, wherein the media data of the first segment comprises a first stream access point, receiving a second segment of media data, wherein the media data of the second segment lacks a stream access point at the beginning of the second segment, and before a second stream access point, subsequent to the first stream access point, is available, decoding at least a portion of the media data of the second segment relative to at least a portion of the media data of the first segment. In particular, in this example, the second segment includes a third stream access point, separate from both the first stream access point and the second stream access point, and the third stream access point occurs at a position other than the beginning of the second segment. In this manner, the third stream access point occurs subsequent to the first stream access point, but before the second stream access point. The portion of the second segment decoded relative to the first segment may correspond to one or more pictures preceding the scene change IDR in decoding order.

The method of FIG. 20 also represents an example of a method including obtaining a first segment of media data, wherein the media data of the first segment comprises a first stream access point, sending the first segment to a client device, obtaining a second segment of media data, wherein the media data of the second segment lacks a stream access point at the beginning of the second segment and wherein at least a portion of the media data of the second segment is coded relative to a portion of the media data of the first segment, and before a second stream access point, subsequent to the first stream access point, is available, sending the second segment to the client device.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving media data, the method comprising:

receiving, via a network streaming protocol, a first segment of video data of a representation, wherein the video data of the first segment comprises a first stream access point, wherein the first segment comprises a first independently receivable file formatted according to the network streaming protocol, wherein the first segment includes a first plurality of video frames, at least one of the first plurality of video frames comprising the first stream access point, wherein the first segment is associated with a first uniform resource locator (URL), and wherein each of the video frames of the first plurality of video frames comprises a respective, distinct picture order count (POC) value;

receiving, via the network streaming protocol, a second segment of video data of the representation following the first segment, wherein the video data of the second segment lacks a stream access point at the beginning of the second segment to reduce latency, wherein the second segment comprises a second independently receivable file formatted according to the network streaming protocol, wherein the second segment comprises a second plurality of video frames, wherein the second segment is associated with a second, different URL, and wherein each of the video frames of the second plurality of video frames comprises a respective, distinct POC value; and before a second stream access point, subsequent to the first stream access point, is available, decoding, by a processing unit, at least a portion of the video data of the second segment relative to at least a portion of the video data of the first segment, wherein decoding comprises predicting at least a portion of a second video frame of the second plurality of video frames of the second segment using at least a portion of a first video frame of the first plurality of video frames of the first segment.

2. The method of claim 1, wherein the second segment lacks a stream access point.

3. The method of claim 1, wherein the second segment includes a third stream access point at a position other than the beginning of the second segment, and wherein the second stream access point is subsequent to the third stream access point.

4. The method of claim 1, further comprising decoding at least a portion of the video data of the first segment prior to receiving the second segment.

5. The method of claim 1, wherein the coded data of the first segment corresponds to a playback duration, and wherein the coded data of the second segment corresponds to the same playback duration.

6. The method of claim 5, wherein the representation comprises a plurality of segments including the first segment and the second segment, and wherein each of the plurality of segments comprises the same playback duration.

7. The method of claim 1, wherein the coded data of the first segment corresponds to a first duration of playback time, and wherein the coded data of the second segment corresponds to a second playback duration different from the first playback duration.

8. The method of claim 1, wherein the stream access point comprises an instantaneous decoder refresh (IDR) picture of the first segment.

9. The method of claim 1, wherein the first segment comprises a first dynamic adaptive streaming over HTTP (DASH) segment, wherein the second segment comprises a second DASH segment different from the first DASH segment, and wherein the network streaming protocol comprises the DASH protocol.

10. The method of claim 1,
wherein receiving the first segment comprises requesting the first segment using a first HTTP GET or partial GET request that specifies the first URL, and
wherein receiving the second segment comprises requesting the second segment using a second, different HTTP GET or partial GET request that specifies the second URL.

11. A device for receiving media data, the device comprising one or more processors configured with processor-executable instructions to cause the one or more processors to:
receive, via a network streaming protocol, a first segment of video data of a representation, wherein the video data of the first segment comprises a first stream access point, wherein the first segment comprises a first independently receivable file formatted according to the network streaming protocol, wherein the first segment includes a first plurality of video frames, at least one of the first plurality of video frames comprising the first stream access point, wherein the first segment is associated with a first uniform resource locator (URL), and wherein each of the video frames of the first plurality of video frames comprises a respective, distinct picture order count (POC) value,
receive, via the network streaming protocol, a second segment of video data of the representation following the first segment, wherein the video data of the second segment lacks a stream access point at the beginning of the second segment to reduce latency, wherein the second segment comprises a second independently receivable file formatted according to the network streaming protocol, wherein the second segment comprises a second plurality of video frames, wherein the second segment is associated with a second, different URL, and wherein each of the video frames of the second plurality of video frames comprises a respective, distinct POC value, and
before a second stream access point, subsequent to the first stream access point, is available, decode at least a portion of the video data of the second segment relative to at least a portion of data of the first segment, wherein to decode at least the portion of the video data of the second segment, the one or more processors are configured to predict at least a portion of a second video frame of the second plurality of video frames of the second segment using at least a portion of a first video frame of the first plurality of video frames of the first segment.

12. The device of claim 11, wherein the second segment lacks a stream access point.

13. The device of claim 11, wherein the second segment includes a third stream access point at a position other than the beginning of the second segment, and wherein the second stream access point is subsequent to the third stream access point.

14. The device of claim 11, wherein the one or more processors are configured to decode at least a portion of the video data of the first segment prior to receiving the second segment.

15. The device of claim 11, wherein the coded data of the first segment corresponds to a playback duration, and wherein the coded data of the second segment corresponds to the same playback duration.

16. The device of claim 15, wherein the representation comprises a plurality of segments comprising the first segment and the second segment, and wherein each of the plurality of segments comprises the same playback duration.

17. The device of claim 11, wherein the video data of the first segment corresponds to video data having a first playback time, and wherein the video data of the second segment corresponds to video data having a second playback time different from the first playback time.

18. The device of claim 11, wherein the first segment comprises a first dynamic adaptive streaming over HTTP (DASH) segment, wherein the second segment comprises a second DASH segment different from the first DASH segment, and wherein the network streaming protocol comprises the DASH protocol.

19. A non-transitory computer-readable storage medium having stored thereon instructions that, when executed, cause a processor to:
receive, via a network streaming protocol, a first segment of video data of a representation, wherein the video data of the first segment comprises a first stream access point, wherein the first segment comprises a first independently receivable file formatted according to the network streaming protocol, wherein the first segment includes a first plurality of video frames, at least one of the first plurality of video frames comprising the first stream access point, wherein the first segment is associated with a first uniform resource locator (URL), and wherein each of the video frames of the first plurality of video frames comprises a respective, distinct picture order count (POC) value;
receive, via the network streaming protocol, a second segment of video data of the representation following the first segment, wherein the video data of the second segment lacks a stream access point at the beginning of the second segment to reduce latency, wherein the second segment comprises a second independently receivable file formatted according to the network streaming protocol, wherein the second segment comprises a second plurality of video frames, wherein the second segment is associated with a second, different URL, and wherein each of the video frames of the second plurality of video frames comprises a respective, distinct POC value; and before a second stream access point, subsequent to the first stream access point, is available, decode at least a portion of the video data of the second segment relative to at least a portion of the video data of the first segment, wherein the instructions that cause the processor to decode comprise instructions that cause the processor to predict at least a portion of a second video frame of the second plurality of video frames of the second segment using at least a portion of a first video frame of the first plurality of video frames of the first segment.

20. The non-transitory computer-readable storage medium of claim 19, wherein the second segment lacks a stream access point.

21. The non-transitory computer-readable storage medium of claim 19, wherein the second segment includes a third stream access point at a position other than the beginning of the second segment, and wherein the second stream access point is subsequent to the third stream access point.

22. The non-transitory computer-readable storage medium of claim 19, further comprising instructions that cause the processor to decode at least a portion of the video data of the first segment prior to receiving the second segment.

23. The non-transitory computer-readable storage medium of claim 19, wherein the coded data of the first segment corresponds to a playback duration, and wherein the coded data of the second segment corresponds to the same playback duration.

24. The non-transitory computer-readable storage medium of claim 19, wherein the video data of the first segment corresponds to video data having a first playback time, and wherein the video data of the second segment corresponds to video data having a second playback time different from the first playback time.

25. The non-transitory computer-readable storage medium of claim 19, wherein the first segment comprises a first dynamic adaptive streaming over HTTP (DASH) segment, wherein the second segment comprises a second DASH segment different from the first DASH segment, and wherein the network streaming protocol comprises the DASH protocol.

26. A method of sending media data, the method comprising:
obtaining a first segment of video data of a representation, wherein the first segment comprises a first stream access point, wherein the first segment comprises a first independently receivable file formatted according to the network streaming protocol, wherein the first segment includes a first plurality of video frames, at least one of the first plurality of video frames comprising the first stream access point, wherein the first segment is associated with a first uniform resource locator (URL), and wherein each of the video frames of the first plurality of video frames comprises a respective, distinct picture order count (POC) value;
sending, by a processing unit, the first segment to a client device via the network streaming protocol;
obtaining a second segment of video data of the representation following the first segment, wherein the second segment comprises a second independently receivable file formatted according to the network streaming protocol, wherein the second segment comprises a second plurality of video frames, wherein the second segment is associated with a second, different URL, wherein the video data of the second segment lacks a stream access point at the beginning of the second segment to reduce latency, wherein at least a portion of the video data of the second segment is coded relative to at least a portion of the video data of the first segment, wherein each of the video frames of the second plurality of video frames comprises a respective, distinct POC value, and wherein at least a portion of a second video frame of the second plurality of video frames of the second segment is predicted relative to at least a portion of a first video frame of the first plurality of video frames of the first segment; and
before a second stream access point, subsequent to the first stream access point, is available, sending, by the processing unit, the second segment to the client device via the network streaming protocol.

27. The method of claim 26, wherein the second segment lacks a stream access point.

28. The method of claim 26, wherein the second segment includes a third stream access point at a position other than the beginning of the second segment, and wherein the second stream access point is subsequent to the third stream access point.

29. The method of claim 28, further comprising determining that the second segment corresponds to a temporal position at which a stream access point is required, and treating a scene change instantaneous decoder refresh (IDR) picture, corresponding to the stream access point at the position other than the beginning of the second segment, as the required stream access point.

30. The method of claim 28, further comprising forming an ensemble of services, each of the services comprising a respective plurality of segments, wherein one of the services comprises a plurality of segments comprising the first and second segments, wherein forming the ensemble of services comprises:
forming one of the services to comprise a first service, wherein a first SAP of a first segment of the first service has a first presentation time, wherein a second SAP of a second segment of the first service has a second presentation time, and wherein the first segment and the second segment are consecutive within the first service; and
forming one or more of the services to comprise respective plurality of services, separate from the first service, such that, for presentation times between the first presentation time and the second presentation time, the plurality of services include SAPs having presentation times that are between the first presentation time and the second presentation time, different from the first presentation time, and different from presentation times of other SAPs of other services of the plurality of services.

31. The method of claim 30, wherein segments of the plurality of services have a first length, and wherein the first segment of the first service has a length equal to the number of plurality of services times the firth length, plus the first length.

32. The method of claim 30, wherein the ensemble of services comprises a first subset of a full ensemble of services, and wherein a second subset of the full ensemble of services includes plurality of services including SAPs at presentation times of at least some of the presentation times of the plurality of services of the first subset.

33. The method of claim 30, further comprising:
determining whether the ensemble of services includes a number of services that exceeds a threshold number of services; and
when the number of services exceeds the threshold number of services, splitting the ensemble into two or more separate ensembles of services.

34. The method of claim 30, wherein forming the plurality of services comprises inserting the SAPs in a manner substantially conforming to a round-robin insertion, and when a first one of the plurality of services includes a scene change instantaneous decoder refresh (IDR) picture having a presentation time other than a presentation time corresponding to the round-robin insertion, inserting a SAP of a second one of the plurality of services at the presentation time corresponding to the round robin insertion for the first one of the plurality of services.

35. The method of claim 30, wherein when segments of the plurality of services including the SAPs having the presentation times that are between the first presentation time and the second presentation time do not include scene change instantaneous decoder refresh (IDR) pictures, forming first service comprises forming the first segment to have a length that is a multiple of lengths of the segments of the plurality of services, wherein the multiple is greater than one.

36. The method of claim 35, wherein the multiple is greater than or equal to the number of the plurality of services.

37. The method of claim 26, wherein sending the first segment comprises sending the first segment before obtaining the second segment.

38. The method of claim 26, further comprising forming the representation to conform to a low latency live profile of dynamic adaptive streaming over HTTP (DASH) such that the representation includes the first segment and the second segment.

39. The method of claim 26, wherein the coded data for the first segment corresponds to a playback duration, and wherein the coded data for the second segment corresponds to the same playback duration.

40. The method of claim 26, wherein the representation comprises a plurality of segments comprising the first segment and the second segment.

41. The method of claim 26, wherein obtaining the first segment comprises receiving the first segment from a content preparation device, and wherein obtaining the second segment comprises receiving the second segment from the content preparation device.

42. The method of claim 26, wherein obtaining the first segment comprises receiving video data for the first segment in real time during a live recording.

43. The method of claim 26, wherein obtaining the first segment comprises encoding video data for the first segment, and wherein obtaining the second segment comprises encoding video data for the second segment.

44. The method of claim 43, wherein encoding the video data for the second segment comprises encoding at least a portion of the video data for the second segment relative to data for the first segment.

45. The method of claim 26, wherein the first segment comprises a first dynamic adaptive streaming over HTTP (DASH) segment, wherein the second segment comprises a second DASH segment different from the first DASH segment, and wherein the network streaming protocol comprises the DASH protocol.

46. A device for sending media data, the device comprising one or more processors configured with processor-executable instructions to cause the one or more processors to:
obtain a first segment of video data of a representation, wherein the video data of the first segment comprises a first stream access point, wherein the first segment comprises a first independently receivable file formatted according to the network streaming protocol, wherein the first segment includes a first plurality of video frames, at least one of the first plurality of video frames comprising the first stream access point, wherein the first segment is associated with a first uniform resource locator (URL), and wherein each of the video frames of the first plurality of video frames comprises a respective, distinct picture order count (POC) value,
send the first segment to a client device via the network streaming protocol,
obtain a second segment of video data of the representation following the first segment, wherein the second segment comprises a second independently receivable file formatted according to the network streaming protocol, wherein the second segment comprises a second plurality of video frames, wherein the second segment is associated with a second, different URL, wherein the video data of the second segment lacks a stream access point at the beginning of the second segment to reduce latency, wherein at least a portion of the video data of the second segment is coded relative to at least a portion of the video data of the first segment, wherein each of the video frames of the second plurality of video frames comprises a respective, distinct POC value, and wherein at least a portion of a second video frame of the second plurality of video frames of the second segment is predicted relative to at least a portion of a first video frame of the first plurality of video frames of the first segment, and
before a second stream access point, subsequent to the first stream access point, is available, send the second segment to the client device via the network streaming protocol.

47. The device of claim 46, wherein the second segment lacks a stream access point.

48. The device of claim 46, wherein the second segment includes a third stream access point at a position other than the beginning of the second segment, and wherein the second stream access point is subsequent to the third stream access point.

49. The device of claim 46, wherein the one or more processors are configured to send the first segment before obtaining the second segment.

50. The device of claim 46, wherein the coded data for the first segment corresponds to a playback duration, and wherein the coded data for the second segment corresponds to the same playback duration.

51. The device of claim 46, wherein the representation comprises a plurality of segments comprising the first segment and the second segment.

52. The device of claim 46, wherein the one or more processors are configured to encode video data for the first segment and to encode video data for the second segment relative to data for the first segment.

53. The device of claim 46, wherein the first segment comprises a first dynamic adaptive streaming over HTTP (DASH) segment, wherein the second segment comprises a second DASH segment different from the first DASH segment, and wherein the network streaming protocol comprises the DASH protocol.

54. A non-transitory computer-readable storage medium having stored thereon instructions that, when executed, cause a processor to:
obtain a first segment of video data of a representation, wherein the video data of the first segment comprises a stream access point, wherein the first segment comprises a first independently receivable file formatted according to the network streaming protocol, wherein the first segment includes a first plurality of video frames, at least one of the first plurality of video frames comprising the first stream access point, and wherein the first segment is associated with a first uniform resource locator (URL), and wherein each of the video frames of the first plurality of video frames comprises a respective, distinct picture order count (POC) value;
send the first segment to a client device via the network streaming protocol;
obtain a second segment of video data of the representation following the first segment, wherein the second segment comprises a second independently receivable file formatted according to the network streaming protocol, wherein the second segment comprises a second plurality of video frames, wherein the second segment is associated with a second, different URL, wherein the video data of the second segment lacks a stream access point at the beginning of the second segment to reduce latency, wherein at least a portion of the video data of the second segment is coded relative to at least a portion of the video data of the first segment, wherein each of the video frames of the second plurality of video frames comprises a respective, distinct POC value, and wherein at least a portion of a second video frame of the second plurality of video frames of the second segment is predicted relative to at least a portion of a first video frame of the first plurality of video frames of the first segment; and
before a second stream access point, subsequent to the first stream access point, is available, send the second segment to the client device via the network streaming protocol.

55. The non-transitory computer-readable storage medium of claim 54, wherein the second segment lacks a stream access point.

56. The non-transitory computer-readable storage medium of claim 54, wherein the second segment includes a third stream access point at a position other than the beginning of the second segment, and wherein the second stream access point is subsequent to the third stream access point.

57. The non-transitory computer-readable storage medium of claim 54, wherein the instructions that cause the processor to send the first segment comprise instructions that cause the processor to send the first segment before obtaining the second segment.

58. The non-transitory computer-readable storage medium of claim 54, wherein the representation, comprises a plurality of segments comprising the first segment and the second segment.

59. The non-transitory computer-readable storage medium of claim 54, wherein the instructions that cause the processor to obtain the first segment comprise instructions that cause the processor to encode video data for the first segment, and wherein the instructions that cause the processor to obtain the second segment comprise instructions that cause the processor to encode video data for the second segment relative to data for the first segment.

60. The non-transitory computer-readable storage medium of claim 54, wherein the first segment comprises a first dynamic adaptive streaming over HTTP (DASH) segment, wherein the second segment comprises a second DASH segment different from the first DASH segment, and wherein the network streaming protocol comprises DASH.

\* \* \* \* \*